United States Patent
Ochi et al.

(10) Patent No.: US 10,911,466 B2
(45) Date of Patent: Feb. 2, 2021

(54) NETWORK PROTECTION DEVICE AND NETWORK PROTECTION SYSTEM

(71) Applicant: Panasonic Intellectual Property Corporation of America, Torrance, CA (US)

(72) Inventors: Naoki Ochi, Osaka (JP); Takuji Hiramoto, Osaka (JP); Tomohiro Oda, Osaka (JP); Tatsumi Oba, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 160 days.

(21) Appl. No.: 16/202,926

(22) Filed: Nov. 28, 2018

(65) Prior Publication Data

US 2019/0166139 A1    May 30, 2019

(30) Foreign Application Priority Data

Nov. 30, 2017  (JP) .................. 2017-230201
Jun. 5, 2018  (JP) .................. 2018-107964
Oct. 3, 2018  (JP) .................. 2018-188227

(51) Int. Cl.
*H04L 29/06* (2006.01)
*H04L 12/741* (2013.01)
(Continued)

(52) U.S. Cl.
CPC ........ *H04L 63/1416* (2013.01); *H04L 41/142* (2013.01); *H04L 43/04* (2013.01);
(Continued)

(58) Field of Classification Search
CPC ............. H04L 63/0227; H04L 63/0236; H04L 63/0245; H04L 63/14; H04L 63/1425;
(Continued)

(56) References Cited

U.S. PATENT DOCUMENTS 7,817,549 B1 * 10/2010 Kasralikar .......... H04L 63/1408
370/232
8,042,171 B1 * 10/2011 Nordstrom .......... H04L 63/1441
726/13
(Continued)

FOREIGN PATENT DOCUMENTS

CN    106789865    5/2017
EP    1628455    2/2006
(Continued)

OTHER PUBLICATIONS

Ke Wang et al., "Anomalous Payload-based Network Intrusion Detection", RAID, vol. 4, 2004.
(Continued)

*Primary Examiner* — Malcolm Cribbs
(74) *Attorney, Agent, or Firm* — Wenderoth, Lind & Ponack, L.L.P.

(57) ABSTRACT

A network protection device includes a packet capture unit which captures a network packet through an intelligent switch which performs connection in a communication network or across communication networks; a network analyzer which detects a threat in the network packet; a threat remover which removes the threat in the network packet; and a switch operator which changes from a first communication path, which connects a sender node to a receiver node without the threat remover, to a second communication path, which is different from the first communication path and connects the sender node to the receiver node through the threat remover when the threat is detected in the threat detector.

20 Claims, 35 Drawing Sheets

(51) Int. Cl.
    *H04L 12/24* (2006.01)
    *H04L 12/26* (2006.01)
(52) U.S. Cl.
    CPC ............ *H04L 43/062* (2013.01); *H04L 45/74* (2013.01); *H04L 63/0245* (2013.01); *H04L 63/0272* (2013.01); *H04L 63/145* (2013.01); *H04L 63/1408* (2013.01); *H04L 63/18* (2013.01)
(58) Field of Classification Search
    CPC ... H04L 63/1416; H04L 41/142; H04L 43/04; H04L 43/062; H04L 45/74; H04L 63/0272; H04L 63/1408; H04L 63/145; H04L 63/18
    See application file for complete search history.

(56) References Cited

U.S. PATENT DOCUMENTS

| | | | | |
|---|---|---|---|---|
| 8,255,996 | B2* | 8/2012 | Elrod | H04L 63/1416 370/245 |
| 9,762,610 | B1* | 9/2017 | Kwan | H04L 63/1458 |
| 10,516,694 | B1* | 12/2019 | Gupta | H04L 63/1425 |
| 2002/0083175 | A1* | 6/2002 | Afek | H04L 63/1458 709/225 |
| 2002/0174216 | A1* | 11/2002 | Shorey | H04L 43/00 709/224 |
| 2006/0059552 | A1 | 3/2006 | Aoki et al. | |
| 2006/0095961 | A1 | 5/2006 | Govindarajan et al. | |
| 2006/0239203 | A1* | 10/2006 | Talpade | H04L 43/0829 370/252 |
| 2007/0157306 | A1* | 7/2007 | Elrod | H04L 63/1416 726/14 |
| 2009/0003317 | A1* | 1/2009 | Kasralikar | H04L 63/1408 370/352 |
| 2012/0297042 | A1* | 11/2012 | Davis | H04L 63/164 709/223 |
| 2013/0246639 | A1* | 9/2013 | Nedbal | H04L 63/1408 709/228 |
| 2013/0254879 | A1* | 9/2013 | Chesla | H04L 67/141 726/22 |
| 2013/0333029 | A1* | 12/2013 | Chesla | H04L 67/327 726/22 |
| 2014/0211614 | A1* | 7/2014 | Winn | H04L 41/0668 370/225 |
| 2014/0241353 | A1* | 8/2014 | Zhang | H04L 49/253 370/390 |
| 2014/0282542 | A1* | 9/2014 | Smith | G06F 9/4411 718/1 |
| 2016/0232019 | A1* | 8/2016 | Shah | G06F 9/45558 |
| 2017/0063683 | A1* | 3/2017 | Li | H04L 45/74 |
| 2017/0180249 | A1* | 6/2017 | Shen | G06F 9/45558 |
| 2017/0223032 | A1* | 8/2017 | El-Moussa | H04L 63/1425 |
| 2018/0084005 | A1* | 3/2018 | Dousti | H04L 63/1458 |
| 2018/0124090 | A1* | 5/2018 | Koren | H04L 63/20 |
| 2018/0248908 | A1* | 8/2018 | Bjarnason | H04L 63/1458 |
| 2018/0255094 | A1* | 9/2018 | Doron | H04L 63/1458 |

FOREIGN PATENT DOCUMENTS

| | | |
|---|---|---|
| JP | 2006-74705 | 3/2006 |
| JP | 4082613 | 4/2008 |
| JP | 2016-5138 | 1/2016 |
| JP | 6364255 | 7/2018 |

OTHER PUBLICATIONS

Extended European Search Report dated Jan. 29, 2019 in corresponding European Patent Application No. 18208423.6.

* cited by examiner

FIG. 4

| NODE ID | IP ADDRESS | MAC ADDRESS | TIMESTAMP | TYPE OF THREAT |
|---|---|---|---|---|
| 302 | 192.168.0.6 | 12:32:13:43:b3:d1 | T0 | VULNERABILITY ATTACK |

| SWITCH ID | CONNECTION PORT NUMBER | VLAN ID | MAC ADDRESS |
|---|---|---|---|
| 20 | 4 | VLAN1 | 12 : 32 : 13 : 43 : a5 : s6 |
| 20 | 7 | VLAN2 | 12 : 32 : 13 : 43 : b3 : d1 |

FIG. 9

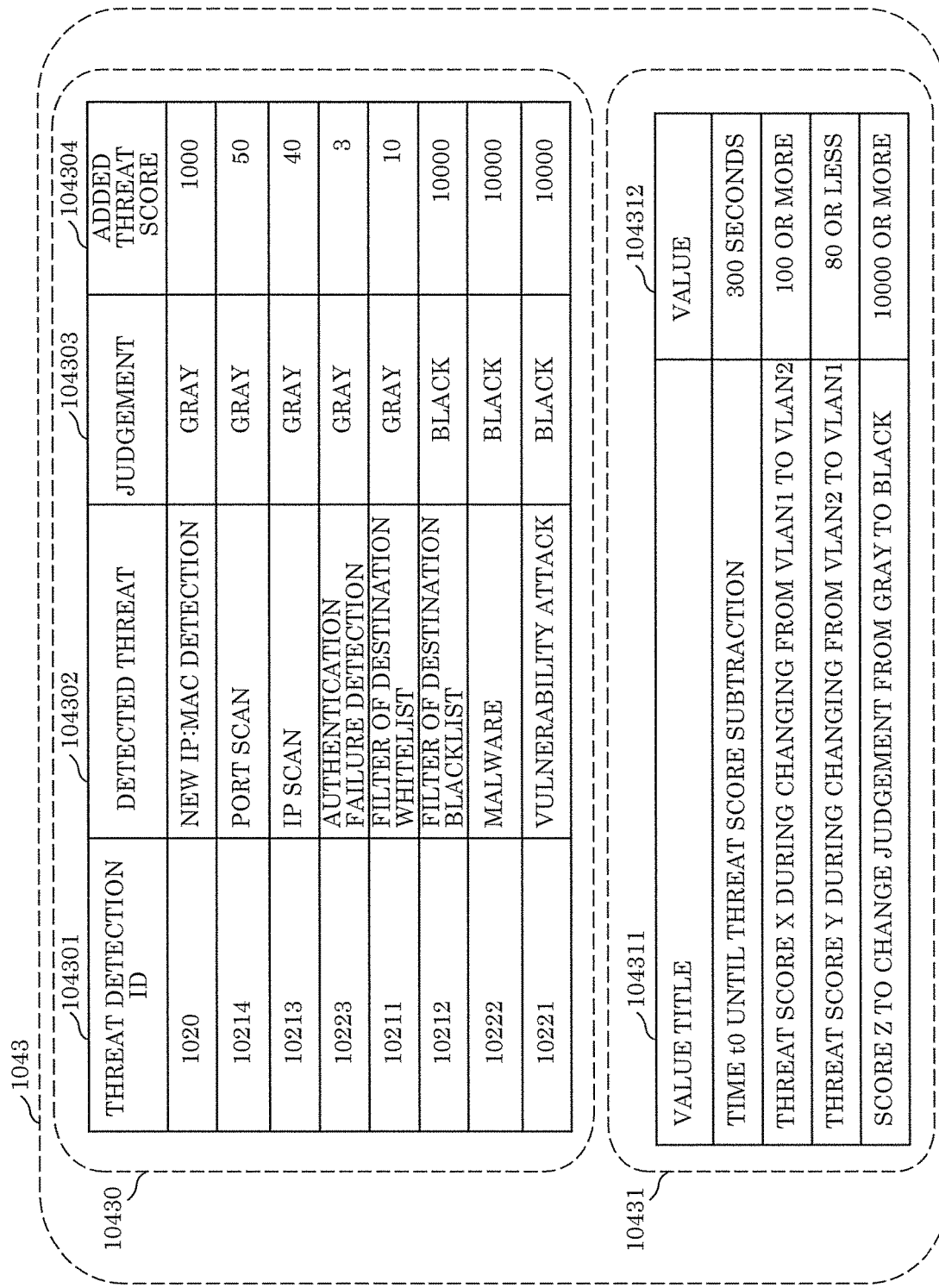

| THREAT DETECTION ID | DETECTED THREAT | JUDGEMENT | ADDED THREAT SCORE |
|---|---|---|---|
| 1020 | NEW IP:MAC DETECTION | GRAY | 1000 |
| 10214 | PORT SCAN | GRAY | 50 |
| 10213 | IP SCAN | GRAY | 40 |
| 10223 | AUTHENTICATION FAILURE DETECTION | GRAY | 3 |
| 10211 | FILTER OF DESTINATION WHITELIST | GRAY | 10 |
| 10212 | FILTER OF DESTINATION BLACKLIST | BLACK | 10000 |
| 10222 | MALWARE | BLACK | 10000 |
| 10221 | VULNERABILITY ATTACK | BLACK | 10000 |

| VALUE TITLE | VALUE |
|---|---|
| TIME t0 UNTIL THREAT SCORE SUBTRACTION | 300 SECONDS |
| THREAT SCORE X DURING CHANGING FROM VLAN1 TO VLAN2 | 100 OR MORE |
| THREAT SCORE Y DURING CHANGING FROM VLAN2 TO VLAN1 | 80 OR LESS |
| SCORE Z TO CHANGE JUDGEMENT FROM GRAY TO BLACK | 10000 OR MORE |

FIG. 11

| SWITCH ID | SWTICH PORT NUMBER | VLAN ID | MAC ADDRESS | IP ADDRESS | TIMESTAMP | THREAT SCORE |
|---|---|---|---|---|---|---|
| 20 | 7 | VLAN2 | 12:32:13:43:b3:d1 | 192.168.0.6 | T1 | 10080 |

FIG. 12A

| NODE DATA ID | SWITCH ID | SWTICH PORT NUMBER | VLAN ID | MAC ADDRESS | IP ADDRESS | TIMESTAMP | THREAT SCORE |
|---|---|---|---|---|---|---|---|
| 0 | 20 | 4 | VLAN1 | 12:32:13:43:a5:s6 | 192.168.0.3 | T0 | 0 |
| 1 | 20 | 7 | VLAN1 | 12:32:13:43:b3:d1 | 192.168.0.6 | T0 | 80 |

FIG. 12B

| NODE DATA ID | SWITCH ID | SWTICH PORT NUMBER | VLAN ID | MAC ADDRESS | IP ADDRESS | TIMESTAMP | THREAT SCORE |
|---|---|---|---|---|---|---|---|
| 0 | 20 | 4 | VLAN1 | 12:32:13:43:a5:s6 | 192.168.0.3 | T0 | 0 |
| 1 | 20 | 7 | VLAN2 | 12:32:13:43:b3:d1 | 192.168.0.6 | T1 | 10080 |

FIG. 21

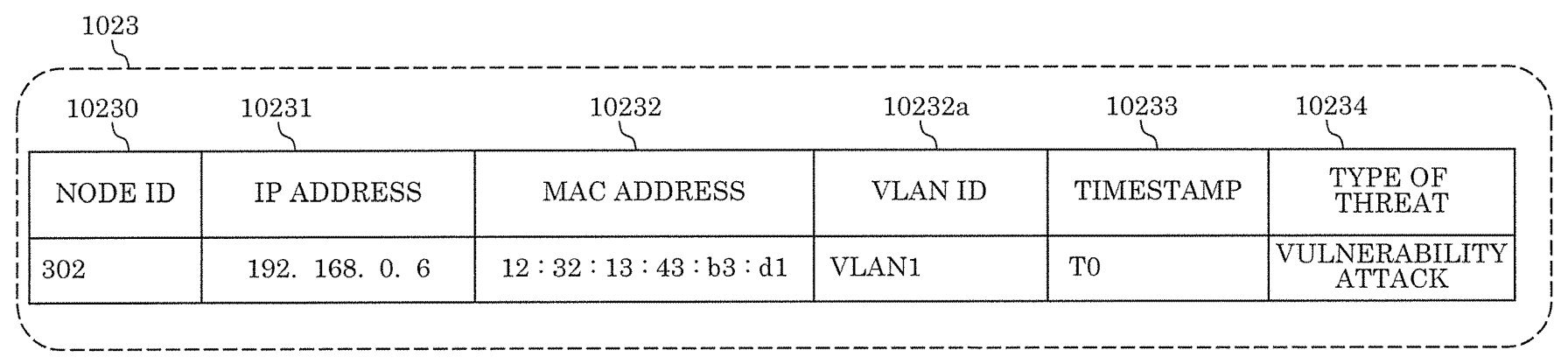

| | 10230 | 10231 | 10232 | 10232a | 10233 | 10234 |
|---|---|---|---|---|---|---|
| 1023 | NODE ID | IP ADDRESS | MAC ADDRESS | VLAN ID | TIMESTAMP | TYPE OF THREAT |
| | 302 | 192.168.0.6 | 12:32:13:43:b3:d1 | VLAN1 | T0 | VULNERABILITY ATTACK |

FIG. 23

| SWITCH ID | SWITCH PORT NUMBER | VLAN ID | MAC ADDRESS |
|---|---|---|---|
| 20 | 4 | VLAN1a | 12 : 32 : 13 : 43 : a5 : s6 |
| 20 | 7 | VLAN1b | 12 : 32 : 13 : 43 : b3 : d1 |
| 20 | 5 | VLAN2a | 12 : 32 : 13 : 23 : 00 : 01 |
| 20 | 6 | VLAN2b | 12 : 32 : 13 : 89 : ec : 01 |

FIG. 24A

| NODE DATA ID | SWITCH ID | SWITCH PORT NUMBER | VLAN ID | MAC ADDRESS | IP ADDRESS | TIMESTAMP | THREAT SCORE |
|---|---|---|---|---|---|---|---|
| 0 | 20 | 4 | VLAN1a | 12:32:13:43:a5:s6 | 192.168.0.3 | T0 | 0 |
| 1 | 20 | 7 | VLAN1b | 12:32:13:43:b3:d1 | 192.168.0.6 | T0 | 80 |
| 2 | 20 | 5 | VLAN2a | 12:32:13:23:00:01 | 192.168.10.5 | T0 | 0 |
| 3 | 20 | 6 | VLAN2b | 12:32:13:89:ec:01 | 192.168.10.8 | T0 | 30 |

FIG. 24B

| NODE DATA ID | SWITCH ID | SWITCH PORT NUMBER | VLAN ID | MAC ADDRESS | IP ADDRESS | TIMESTAMP | THREAT SCORE |
|---|---|---|---|---|---|---|---|
| 0 | 20 | 4 | VLAN1a | 12:32:13:43:a5:s6 | 192.168.0.3 | T0 | 0 |
| 1 | 20 | 7 | VLAN1b | 12:32:13:43:b3:d1 | 192.168.0.6 | T1 | 10080 |
| 2 | 20 | 5 | VLAN2a | 12:32:13:23:00:01 | 192.168.10.5 | T0 | 0 |
| 3 | 20 | 6 | VLAN2b | 12:32:13:89:ec:01 | 192.168.10.8 | T2 | 10030 |

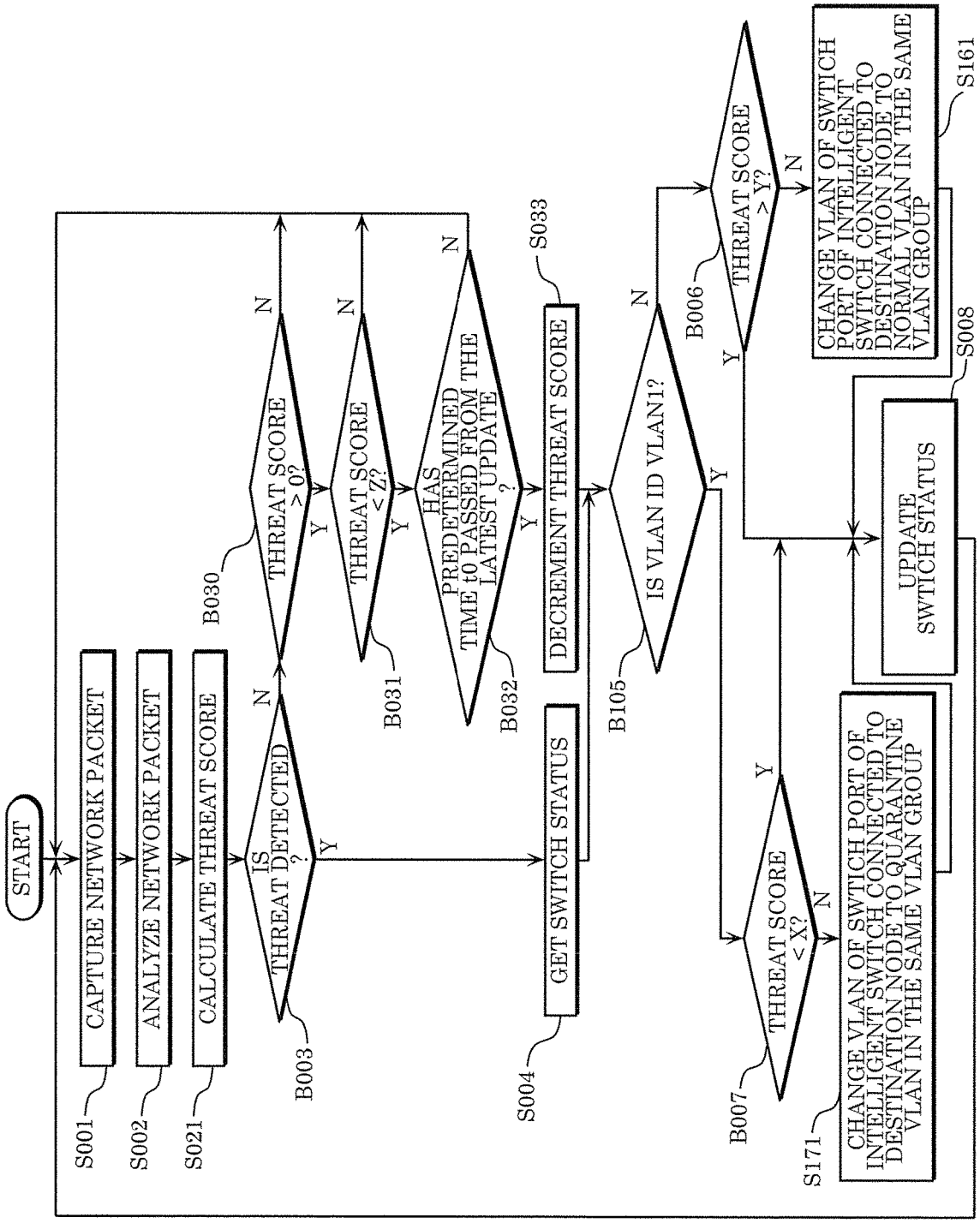

27# NETWORK PROTECTION DEVICE AND NETWORK PROTECTION SYSTEM

CROSS REFERENCE TO RELATED APPLICATION

This application claims the benefit of priority of Japanese Patent Application Number 2017-230201 filed on Nov. 30, 2017, Japanese Patent Application Number 2018-107964 filed on Jun. 5, 2018, and Japanese Patent Application Number 2018-188227 filed on Oct. 3, 2018, the entire content of which is hereby incorporated by reference.

BACKGROUND

1. Technical Field

The present disclosure relates to network protection devices and network protection systems which monitor communication networks and control communication.

2. Description of the Related Art

With recent development of network techniques, a variety of devices are connected to networks. Accompanied by this, damage has been increasingly caused by malware infection and attack such as invasion of malware from the outside, leading to an increase in importance of security measures.

Examples of standard security measures to be used include a method of monitoring the boundaries of a network to protect the network against accesses from external networks, and a method of monitoring nodes themselves to protect a network. Specifically, such standard security measures are implemented by disposing a security device, such as a fire wall (FW), an intrusion detection system (IDS), an intrusion prevention system (IPS), and a unified threat management (UTM) device at the boundaries between the Internet and a local area network (LAN). Alternatively, anti-malware software is installed in the nodes disposed inside the LAN, and the latest security patches are applied to the operating system and the application software.

Unfortunately, cases have been increasing where nodes to which the standard security measures cannot be applied are connected to networks in facilities and factories: for example, nodes required for fault-tolerant operation and nodes not allowing the addition or update of software at all due to a severe requirement on production operation on time. Any security measures cannot be applied to these nodes, undesirably allowing malware to easily invade the network including these nodes, and increasing the risks of the network exposed to threats such as malware infection. For this reason, invasion of a malware into the LAN causes further expansion of the infection, causing a variety of failures inside the LAN. Accordingly, new security measures to prevent such expansion of infection have been required.

A traditional security device capable of communicating with several computers including a first computer and a second computer is disposed inside a LAN. The security device captures a network packet at any time point, and determines whether to transmit the captured network packet to the first computer or the second computer. Such a security device and techniques of restricting communication services with the first computer and the second computer are disclosed (see Japanese Patent No. 4082613, for example).

Moreover, a technique of transmitting a network packet, which passes through a switching device, to a security device having a promiscuous mode, and monitoring the network packet to control communication with a software defined network (SDN) switching device (see Japanese Patent No. 6364255, for example).

SUMMARY

In Japanese Patent No. 4082613, however, all the network packets in the LAN should be taken into the security device in order to monitor through the inside of the LAN and exclude the threats to the security. In an attempt to implement this method with the security device according to Japanese Patent No. 4082613, communication control packets should be continuously transmitted to every combination of all the nodes, increasing pairs needed for the control in order of the square of the number of pairs. In this case, communication concentrates on the security device, tightening communication states and increasing the load to the security device. This adversely affects the nodes which should satisfy the severe requirement on production operation on time as described above.

Moreover, the network packet including a threat cannot be completely removed because the network packet cannot be surely taken into the security device in the state of an insufficient frequency to transmit network packets for control for taking the network packet into the security device.

In Japanese Patent No. 6364255, because the communication is restricted through the control of the SDN switching device by the security device which monitors threats inside the LAN, an increased load to the security device results in a delay of detection of threats or a delay of the entire communication.

In addition, all the network packets on the node having a threat detected by the security device, including the network packet having a normal content, are undesirably restricted according to the content of the detected threat, causing unexpected disconnection of the communication and thus adverse influences over its control.

Furthermore, the detection only by a single security device may lead to adverse influences over the normal communication caused by detection errors and excessive detection.

An object of the present disclosure is to minimize the fault-tolerant operations of nodes forming a communication network and a delay of communication, and at the same time improve the security level.

The network protection device according to one aspect of the present disclosure includes a packet capture unit which includes multiple local area network (LAN) ports, and captures a network packet in a promiscuous mode through a switch which performs connection in a communication network or across communication networks, the network packet flowing through the switch and containing at least information of a sender node and information of a receiver node; a threat detector which detects a threat in the network packet; a threat remover; a VLAN ID setter which operates the switch to change a communication path, when a threat is detected in the threat detector, such that a first communication path which connects the sender node to the receiver node without the threat remover is changed to a second communication path which is different from the first communication path and connects the sender node to the receiver node through the threat remover. The threat remover removes the threat in the network packet after the VLAN ID setter changes the communication path.

Comprehensive or specific aspects thereof may be implemented with systems, methods, integrated circuits, computer programs, or recording media such as a computer-readable CD-ROM, or may be implemented with any combination of systems, methods, integrated circuits, computer programs, and recording media.

According to the aspect above, the fault-tolerant operations of nodes forming a communication network and a delay of communication are minimized, and at the same time the security level is improved.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram illustrating a configuration of node communication information according to Embodiment 1;

FIG. 7 is a diagram illustrating a configuration of a switch status in Embodiment 1;

FIG. 9 is a diagram illustrating a configuration of threat score information in Embodiment 1;

FIG. 11 is a diagram illustrating a configuration of differential node data in Embodiment 1;

FIG. 12A is a diagram illustrating a configuration of node data in Embodiment 1;

FIG. 12B is a diagram illustrating another configuration of node data in Embodiment 1;

FIG. 21 is a diagram illustrating a configuration of node communication information in Embodiment 2;

FIG. 23 is a diagram illustrating a configuration of a switch status in Embodiment 2;

FIG. 24A is a diagram illustrating a configuration of node data in Embodiment 2;

FIG. 24B is a diagram illustrating another configuration of node data in Embodiment 2;

FIG. 26 is a flowchart illustrating an operation of a network protection device according to Embodiment 2;

Figure 1:
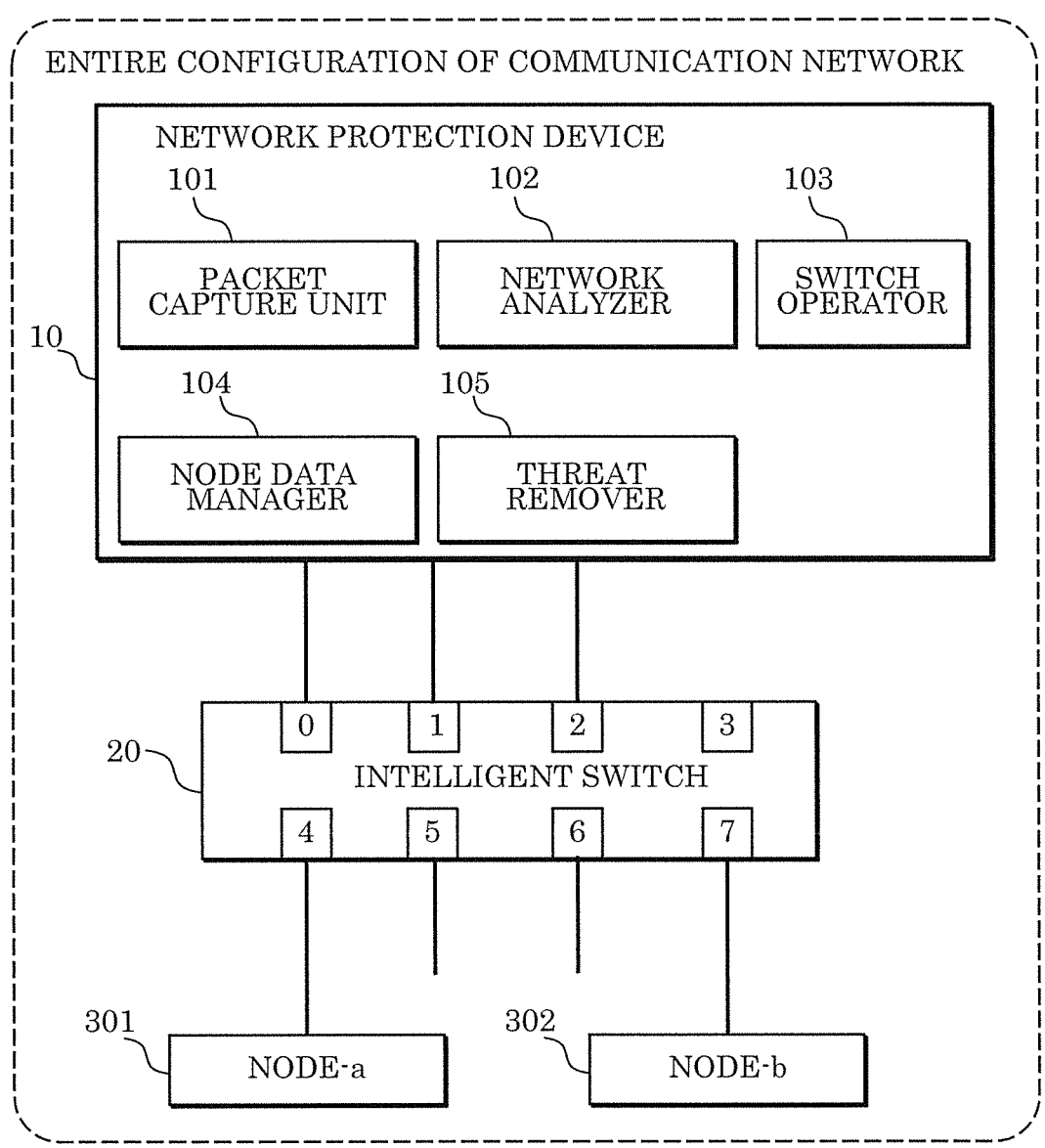
FIG. 1 is a diagram illustrating the entire configuration of a communication network to which a network protection device according to Embodiment 1 belongs.

DETAILED DESCRIPTION OF THE EMBODIMENTS (Knowledge as Basis of the Present Disclosure)

Some control nodes of industrial devices disposed in factories are designed and mounted long time ago, and the connection thereof to the Internet is not considered in some cases. Any countermeasures to the security of such control nodes against the threat from the Internet are not taken.

Furthermore, the availability of those control nodes is strongly required, which means that an increase in delayed production operation and a stop of the operation caused by the control nodes should be prevented as much as possible. For this reason, the update of software including the operating system, such as introduction of security software and security patches is not allowed.

The network of industrial devices including those control nodes, however, is currently connected to the Internet and their security is under threat.

Accordingly, a delay and stop of production operation should be prevented by monitoring the threat to the security of the entire network of the industrial devices, and at the same time, disarming of attack by malware and expansion of damage should be prevented. For example, Japanese Patent No. 4082613 and Japanese Patent No. 6364255 described above disclose techniques of detecting and disarming attack by monitoring the communication network data. Unfortunately, these techniques do not assume the prevention of an increase in delay of production operation and the stop thereof required for the industrial devices network and adverse effects on control of the operation caused by sudden disconnection of communication.

Accordingly, an object of the present disclosure is to attain non-stop operation of nodes needed for a control system network in a factory, minimize a delay of communication, and improve the security level thereof.

(On Aspect According to the Present Disclosure)

The network protection device according to one aspect of the present disclosure includes a packet capture unit which includes multiple local area network (LAN) ports, and captures a network packet in a promiscuous mode through a switch which performs connection in a communication network or across communication networks, the network packet flowing through the switch and containing at least information of a sender node and information of a receiver node; a threat detector which detects a threat in the network packet; a threat remover; and a VLAN ID setter which operates the switch to change a communication path, when a threat is detected in the threat detector, such that a first communication path which connects the sender node to the receiver node without the threat remover is changed to a second communication path which is different from the first communication path and connects the sender node to the receiver node through the threat remover. The threat remover removes the threat in the network packet after the VLAN ID setter changes the communication path.

In such a configuration, threats can be detected by continuously monitoring a copy of the network packet passing via the switch by a network analyzer. When a threat is detected, the VLAN ID setter logically separates the communication network to which the sender node belongs and which may contain the threat from the communication network to which the receiver node belongs by changing the setting of the switch, and changes such that the threat remover is logically connected to the path between the communication network to which the sender node belongs and which may contain the threat and the communication network to which the receiver node belongs. Thereby, the threat can be removed from the network packet that is transmitted from the sender node and may contain the threat. Thus, communication can be performed without stopping the operation of the nodes (without adversely affecting the normal communication), and at the same time, threats can be monitored and the spreading of malware can be prevented.

Moreover, the network analyzer which detects a threat is separated from the threat remover which removes a threat to continue normal communication between the communication network to which the sender node belongs and the communication network to which the receiver node belongs. In other words, the network analyzer is separated from the threat remover as different processors. For this reason, the processing loads of these processors can be minimized. Thereby, the threat can be detected through searching by the network analyzer before the threat is executed, and then the threat can be removed by the threat remover. As a result, threats to the security can be treated at earlier stages.

Accordingly, the network protection device can minimize the fault-tolerant operations of the nodes forming a communication network and a delay of communication, and at the same time, can improve the security level. In particular, the fault-tolerant operation of the existing facility can be provided without affecting the existing facility.

The network protection system according to one aspect of the present disclosure includes a packet capture unit which includes multiple LAN ports, and captures a network packet in a promiscuous mode through a switch which performs connection in a communication network or across communication networks, the network packet flowing through the switch and containing at least information of a sender node and information of a receiver node; a threat detector which detects a threat in the network packet; a threat remover; and a VLAN ID setter which operates the switch to change a communication path, when a threat is detected in the threat detector, such that a first communication path which connects the sender node to the receiver node is changed to a second communication path which is different from the first communication path and connects the sender node to the receiver node through the threat remover. The threat remover removes the threat in the network packet after the VLAN ID setter changes the communication path.

The network protection system can also provide the same effects as described above.

In the network protection device according to one aspect of the present disclosure, the switch includes a first LAN port connected to the sender node, a second LAN port and a third LAN port connected to the threat detector, and a fourth LAN port connected to the receiver node. When a threat is not detected in the threat detector, the VLAN ID setter sets the first communication path from the sender node connected to the first LAN port to the receiver node connected to the fourth LAN port to a first virtual local area network (VLAN). When a threat is detected in the threat detector, the VLAN ID setter sets part of the second communication path from the sender node connected to the first LAN port to the threat remover connected to the second LAN port, which is contained in the second communication path, to a second VLAN different from the first VLAN, and sets part of the second communication path from the threat remover connected to the third LAN port to the receiver node connected to the fourth LAN port, which is contained in the second communication path, to the first VLAN.

Thereby, when a threat is not detected in the threat detector, the path from the sender node to the receiver node is set to the first VLAN (first communication path). When a threat is detected in the threat detector, the path from the sender node to the threat remover is set to the second VLAN, and the path from the threat remover to the receiver node is set to the first VLAN (the first VLAN and the second VLAN form the second communication path). Thereby, the threat remover can be interposed between the sender node and the receiver node when a threat is detected.

The network protection device according to one aspect of the present disclosure further includes a rewriter which changes a VLAN ID of a communication network included in the network packet which passes through the threat remover. The switch includes a fifth LAN port connected to the sender node, a sixth LAN port connected to the threat remover, and a seventh LAN port connected to the receiver node. When a threat is not detected in the threat detector, the VLAN ID setter sets the sender node connected to the fifth LAN port and the receiver node connected to the seventh LAN port to the first VLAN. When a threat is detected in the threat detector, the VLAN ID setter sets the sender node connected to the fifth LAN port to the second VLAN and sets the receiver node connected to the seventh LAN port to the first VLAN, the sender node and the receiver node being included in the second communication path, and the rewriter changes a VLAN ID indicating the second VLAN, to which the sender node belongs, to a VLAN ID indicating the first VLAN to which the receiver node belongs, through the sixth LAN port, and outputs the network packet containing the VLAN ID, which is changed, to the switch.

As described above, when a threat in the network packet is detected in the threat detector, the sender node is set to the second VLAN and the receiver node is set to the first VLAN. The threat remover removes the threat included in the network packet captured through the sixth port. The rewriter changes the VLAN ID of the communication network included in the network packet from which the threat is removed. In other words, because the VLAN ID indicating the first VLAN is different from the VLAN ID indicating the second VLAN, the rewriter changes the VLAN ID contained in the network packet so as to correspond to the seventh port to which the receiver node is connected. Thereby, even the network packet passing through different VLANs can also be transmitted from the sender node to the receiver node.

In the network protection device according to one aspect of the present disclosure, the first VLAN is a normal network without the threat remover, and the second VLAN is a quarantine network where the threat remover removes a threat in the network packet. When the threat is detected in the threat detector, the VLAN ID setter changes part of the first VLAN from the normal network to the quarantine network.

Thereby, the normal network is changed to the quarantine network when a threat is detected. For this reason, the threat included in the network packet output from the sender node can be removed before the threat reaches the receiver node.

In the network protection device according to one aspect of the present disclosure, when the threat in the network packet is removed in the threat remover, the VLAN ID setter reverts the quarantine network, which has been changed from the normal network, to the normal network.

A delay of communication between the sender node and the receiver node is undesirably caused by the threat remover which remains interposed in the communication path between the sender node and the receiver node even after the threat in the network packet is removed. In contrast, this network protection device reverts the part of the first VLAN from the quarantine network to the normal network after the threat in the network packet is removed. For this reason, a delay of communication between the sender node and the receiver node can be prevented.

In the network protection device according to one aspect of the present disclosure, the packet capture unit captures a copy of the network packet, and the threat detector monitors the copy of the network packet in the promiscuous mode.

For example, when the threat detector is disposed somewhere in the communication path between the sender node and the receiver node, the threat detector monitors all the network packets, resulting in a delay of communication therebetween. In contrast, this network protection device copies the network packet on the communication path and monitors the copy in the promiscuous mode. For this reason, a delay of communication between the sender node and the receiver node can be prevented.

In the network protection device according to one aspect of the present disclosure, the threat remover removes unnecessary data including the threat from the network packet where the threat is detected.

Thereby, the network packet after the removal of the threat, that is, removal of unnecessary data including a threat from the network packet is transmitted to the receiver node. For this reason, the communication amount of the network packet can be reduced.

In the network protection device according to one aspect of the present disclosure, the threat detector gives a score to the sender node from which the threat is detected, according to a content of the threat which is detected. When the score given in the threat detector exceeds a first value, the VLAN ID setter causes the switch to change the communication path such that network packet concerning the sender node to which the score is given passes via the threat remover.

Thereby, threats can be ranked by the score, and thus only network packet having high possibility that a threat is contained can be passed via the threat remover. For this reason, the network packet having low possibility that a threat is contained can be prevented from passing via the threat remover. As a result, the number of network packets passing via the threat remover can be reduced, preventing a delay of communication in the communication path between the sender node and the receiver node.

In the network protection device according to one aspect of the present disclosure, the threat detector subtracts a predetermined value from the score after a predetermined time has passed since the score was given. When the score of the threat which is detected is less than a second value, the VLAN ID setter causes the switch to change the communication path such that the sender node is connected to the receiver node without the threat remover.

Thereby, the content (score) of the threat detected from the network packet can be precisely corrected. For this reason, the number of network packets passing via the threat remover can be reduced as the time passes, preventing a delay of communication in the communication path between the sender node and the receiver node.

In the network protection device according to one aspect of the present disclosure, when the score of the threat which is detected exceeds a third value greater than the first value, the threat detector does not subtract the predetermined value from the score even after a predetermined time has passed since the score was given.

Thereby, it is considered that the possibility of detection errors is low in the network packet having very high possibility that a threat is contained, and therefore the score is maintained without changing the score indicating a threat detected from the network packet. For this reason, the generation of detection errors can be prevented, and the detected threat can be surely removed by the threat remover.

It should be noted that embodiments described below all illustrate specific examples of the present disclosure. These comprehensive or specific aspects may be implemented in systems, methods, integrated circuits, computer programs, or computer-readable recording media, or may be implemented in any combination of systems, methods, integrated circuits, computer programs, or recording media. Numeric values, shapes, components, steps, and orders of steps described in the following embodiments are exemplary, and should not be construed as limitation to the present disclosure. Among the components of the embodiments below, the components not described in an independent claim representing the most superordinate concept of the present disclosure are described as arbitrary component. In all the embodiments, contents of each embodiment can also be combined with each other.

Embodiment 1

The present embodiment will be described with reference to the drawings. The same referential numerals will be given to the same components in the drawings.

1. The Entire Configuration of Communication Network

FIG. 1 is a diagram illustrating an entire configuration of a communication network to which a network protection device according to the present embodiment belongs. Nodes in the communication network according to the present embodiment communicate on Ethernet (registered trademark) specified by IEEE 802.3 using an appropriate protocol according to an application, such as Transmission Control Protocol (TCP)/Internet Protocol (IP) and User Datagram Protocol (UDP)/IP.

As illustrated in FIG. 1, intelligent switch 20 is connected to network protection device 10, destination node-a 301 (receiver node), and source node-b 302 (sender node) with LAN cables in the communication network. Although the destination of packet 1010 in FIG. 2 transmitted by source node-b 302 (described later) is defined as destination node-a 301 for convenience, and the source of packet 1010 to destination node-a 301 is defined as source node-b 302 in the present embodiment, the receiver node may also serves as a sender node, and vice versa. In telecommunications networks, the node (for example, the sender node and the receiver node in the present embodiment) is either a redistribution point (such as data circuit-terminating equipment) or a communication endpoint (such as data terminal equipment).

Intelligent switch 20 includes multiple LAN ports (0 to 7) for connecting the nodes. Hereinafter, the LAN port will be simply referred to as a port. In intelligent switch 20, the numeric values written in the connection points between intelligent switch 20 and the LAN cables indicate the port numbers of the ports connected to the LAN cables. In some cases, source node-b 302 and destination node-a 301 are collectively referred to as "node(s)".

Intelligent switch 20 also has a function to set a logical network called VLAN in each of the ports. Intelligent switch 20 includes port 0 having a mirror function enabling the output of a copy of packet 1010 which passes through intelligent switch 20. Ports 1 to 7 behave in the same manner as in the port of a standard switching hub. The ports (LAN ports) may include not only physical ports but also logical software ports. The software port, however, does not have to include a port such as TCP/IP.

Ports 0 to 2 in intelligent switch 20 are connected to network protection device 10 through their corresponding LAN cables. Port 4 in intelligent switch 20 is connected to destination node-a 301. Port 7 in intelligent switch 20 is connected to source node-b 302. Port 7 is one example of the first port. Port 4 is one example of the fourth port.

2. Configuration of Network Protection Device

Details of network protection device 10 will now be described.

Network protection device 10 includes packet capture unit 101, network analyzer 102, switch operator 103, node data manager 104, and threat remover 105.

Packet capture unit 101 captures packet 1010 in a promiscuous mode. Packet 1010 flows through intelligent switch 20 including multiple ports. Packet capture unit 101 has a function to receive (acquire) packet 1010 communicated between source node-b 302 and destination node-a 301 and output from port 0, and to output packet 1010 to network analyzer 102.

Network analyzer 102 analyzes packet 1010 output from packet capture unit 101. Network analyzer 102 has a function to output information indicating the result of analysis (node communication information described later) to node data manager 104. The port number for the node indicates the port which connects the node to intelligent switch 20.

Switch operator 103 has a function to acquire information (switch status described later) including the port number for the node associated with the address of the node held by intelligent switch 20, and notify node data manager 104 of the information. Switch operator 103 also switches (changes) the VLAN of intelligent switch 20 from VLAN1 to VLAN2 or from VLAN2 to VLAN1 based on the information output from node data manager 104 (node data, i.e., node data described later). In other words, switch operator 103 has a function to command intelligent switch 20 to switch the VLAN between VLAN1 and VLAN2. Here, VLAN1 is a normal network, and VLAN2 is a quarantine network. VLAN1 is one example of the first VLAN, and VLAN2 is one example of the second VLAN.

Node data manager 104 integrates the information indicating the result of analysis output from network analyzer 102 and the information output from switch status getter 1032 (described later) in switch operator 103, and manages the integrated information as node data. Node data manager 104 has a function to notify switch operator 103 of the node data.

Threat remover 105 has a function to acquire packet 1010 transmitted from destination node-a 301, and remove a threat from the captured packet 1010. In other words, threat remover 105 has a function to remove unnecessary data including the threat from packet 1010 from which the threat is detected. Threat remover 105 also has a function to output the packet after the removal of the threat to destination node-a 301. When packet 1010 itself is a threat, threat remover 105 removes packet 1010. When a string of letters contained in packet 1010 is a threat, for example, threat remover 105 outputs packet 1010 to intelligent switch 20 after the removal of the string of letters.

Here, the threat indicates a computer program which causes hazardous or undesired influences, such as damage, breakage, or denial of access, over destination node-a 301 and the information stored in destination node-a 301. Examples thereof include malware, viruses, and spyware.

2-1. Configuration of Packet

Figure 2:
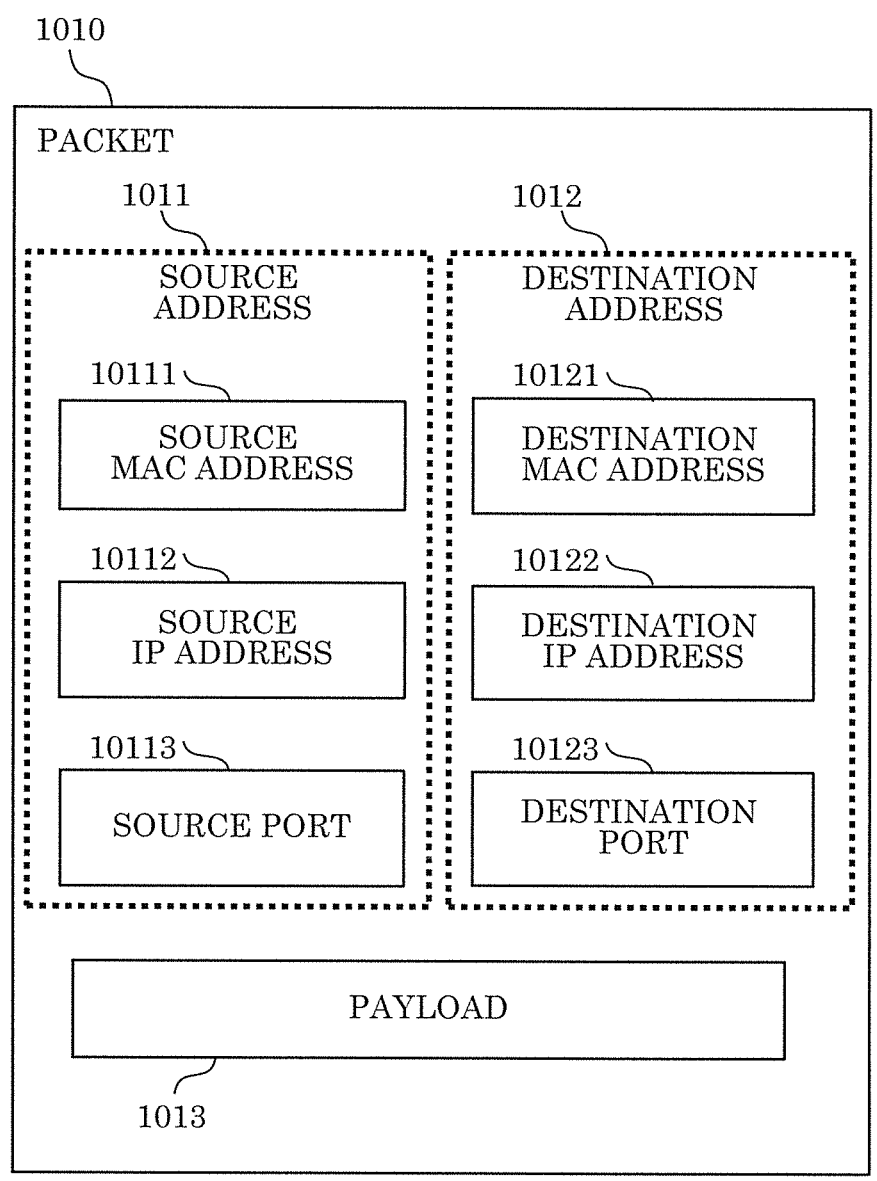
FIG. 2 is a diagram illustrating a configuration of a network packet in Embodiment 1.

FIG. 2 is a diagram illustrating a configuration of packet 1010 in the present embodiment. As illustrated in FIG. 2, packet 1010 contains at least source address 1011, destination address 1012, and payload 1013.

Source address 1011 contains at least source media access control (MAC) address 10111, source IP address 10112, and source port 10113. Source address 1011 is one example of the information on source node-b 302.

Destination address 1012 contains at least destination MAC address 10121, destination IP address 10122, and destination port 10123. Destination address 1012 is one example of the information on the receiver node.

3. Configuration of Network Analyzer

Details of network analyzer 102 will now be described.

Figure 3:
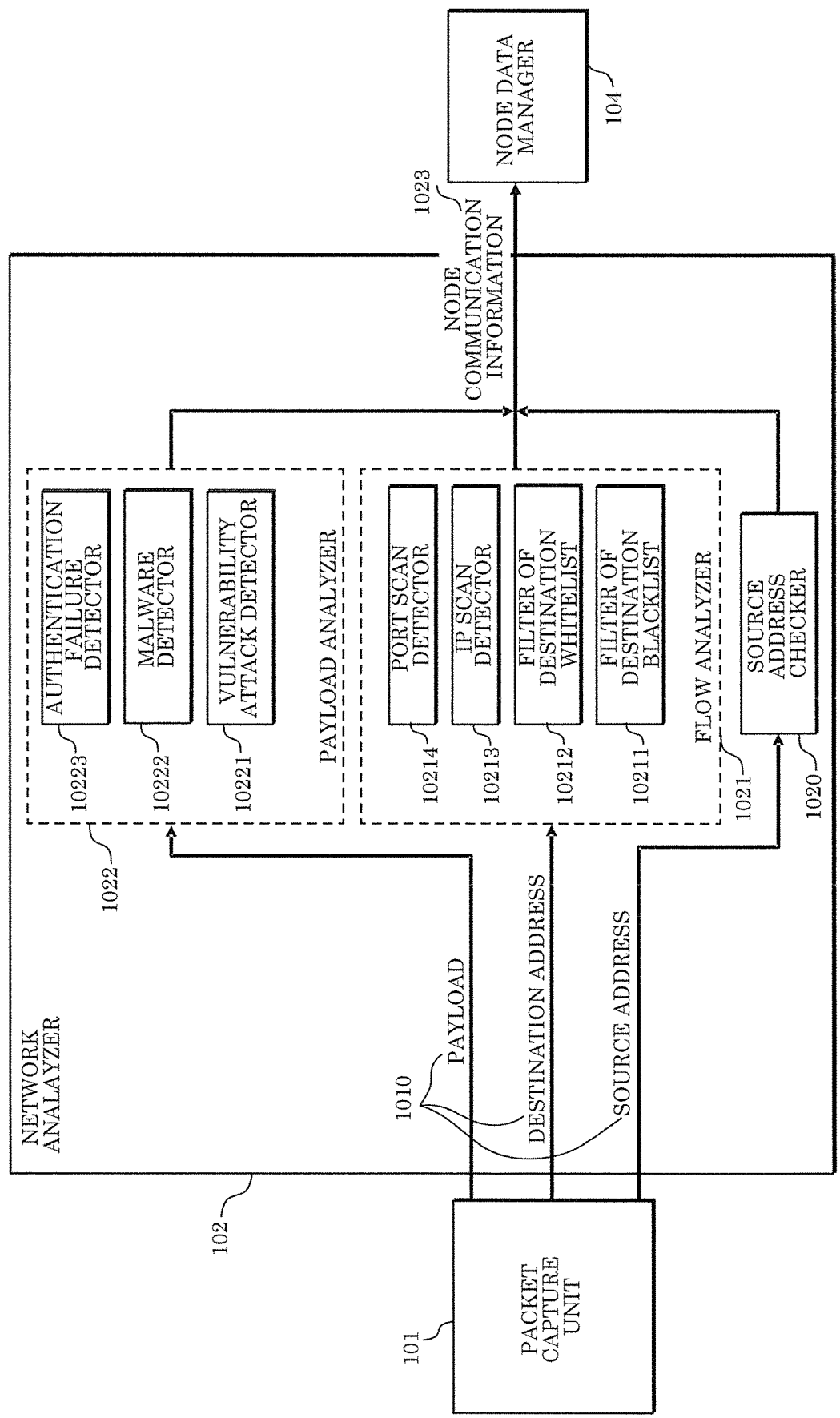
FIG. 3 is a diagram illustrating a configuration of a network analyzer according to Embodiment 1.

FIG. 3 is a diagram illustrating a configuration of network analyzer 102 according to the present embodiment. As illustrated in FIG. 3, network analyzer 102 includes source address checker 1020, flow analyzer 1021, and payload analyzer 1022.

Network analyzer 102 receives packet 1010 from packet capture unit 101, and packet 1010 is analyzed using source address checker 1020, flow analyzer 1021, and payload analyzer 1022. Network analyzer 102 outputs node communication information 1023 to node data manager 104. Node communication information 1023 is a group of pieces of threat detection information from source address checker 1020, flow analyzer 1021, and payload analyzer 1022. Network analyzer 102 is one example of the threat detector.

3-1. Configuration of Source Address Checker

As illustrated in FIGS. 2 and 3, source address checker 1020 receives at least source MAC address 10111 and source IP address 10112 from source address 1011 contained in packet 1010. Based on source address 1011 captured, source address checker 1020 determines whether the MAC address and the IP address of source node-b 302 whose access is prohibited match with source MAC address 10111 and source IP address 10112 or not, and outputs threat detection information, which is the result of determination.

3-2. Configuration of Communication Flow Information Analyzer

Flow analyzer 1021 generates threat detection information based on destination address 1012 contained in packet 1010. Based on destination address 1012, flow analyzer 1021 determines whether a threat is present or not, and outputs threat detection information, which is the result of determination. Flow analyzer 1021 includes filter of destination blacklist 10211, filter of destination whitelist 10212, IP scan detector 10213, and port scan detector 10214. Flow analyzer 1021 does not have to include all the detectors above, and may include part thereof, or may further include another detector.

Filter of destination blacklist 10211 determines whether the destination address of the destination to which access is prohibited matches with destination address 1012 or not. When there is a match, filter of destination blacklist 10211 detects the match as abnormality of security.

Filter of destination whitelist 10212 determines whether the destination address of the destination to which access is permitted matches with destination address 1012 or not. When the match is not found, filter of destination whitelist 10212 detects this case as abnormality of security.

From destination IP address 10122 contained in destination address 1012, IP scan detector 10213 determines whether there are attempts to access to a large number of IP addresses inside the communication network or not. When there are such attempts, IP scan detector 10213 detects the attempts as abnormality of security.

From destination port 10123 contained in destination address 1012, port scan detector 10214 determines whether there are attempts to access to a large number of ports for a specific IP address inside the communication network or not. When there are such attempts, port scan detector 10214 determines the attempts as abnormality of security.

Flow analyzer 1021 may use a detector other than filter of destination blacklist 10211, filter of destination whitelist 10212, IP scan detector 10213, and port scan detector 10214. Examples thereof include a detector which numerically ranks the appropriateness of the attempters of access using machine learning, and determines the attempters having a predetermined score or higher than that as abnormality of security, and a detector which determines that the node having the highest score and several nodes next thereto are suspected of having abnormality of security.

3-3. Configuration of Payload Analyzer

Payload analyzer 1022 in network analyzer 102 generates threat detection information based on payload 1013 contained in packet 1010. Based on payload 1013, payload analyzer 1022 determines whether there is a threat or not, and outputs the threat detection information, which is the result of determination. Payload analyzer 1022 includes vulnerability attack detector 10221, malware detector 10222, and authentication failure detector 10223.

Payload analyzer 1022 does not have to include all of vulnerability attack detector 10221, malware detector 10222, and authentication failure detector 10223 described above, and may further include another detector.

Vulnerability attack detector 10221 determines whether payload 1013 has a pattern to attack the vulnerability of the software incorporated in the node or not. When packet 1010 has a pattern to attack the vulnerability of the software, vulnerability attack detector 10221 detects such a pattern as abnormality of security.

Malware detector 10222 determines whether payload 1013 contains a pattern indicating malware or not. When such a pattern indicating malware is contained, malware detector 10222 detects the pattern as abnormality of security.

Authentication failure detector 10223 receives information of authentication attempts to the node, and determines whether authentication attempts and authentication failures are repeated to a specific node for a predetermined period of time or not. When authentication failures repeatedly occur, authentication failure detector 10223 detects such failures as abnormality of security.

Payload analyzer 1022 may use a detector other than vulnerability attack detector 10221, malware detector 10222, and authentication failure detector 10223. Conceivable examples of such a detector include those disclosed in Wang, Ke, and Salvatore J. Stolfo., "Anomalous payload based network intrusion detection," RAID. Vol. 4. 2004. which detects a score equal to or greater than a predetermined score as abnormality of security by numerically ranking part of the bit pattern of payload 1013 using machine learning or numerically ranking the information obtained from reading the content of payload 1013 using machine learning; and a detector which detects several patterns having higher scores as abnormality of security.

3-4. Configuration of Node Communication Information

Details of node communication information 1023 will now be described. FIG. 4 is a diagram illustrating a configuration of node communication information 1023 according to the present embodiment.

As illustrated in FIGS. 3 and 4, source address checker 1020, flow analyzer 1021, and payload analyzer 1022 analyze packet 1010, and output the results of analysis as node communication information 1023. As illustrated in FIG. 4, node communication information 1023 is composed of node ID 10230, IP address 10231, MAC address 10232, timestamp 10233, and type of threat 10234.

Source address checker 1020 outputs source IP address 10112 as IP address 10231, and source MAC address 10111 as MAC address 10232. The results of determination by flow analyzer 1021 and payload analyzer 1022 are defined as type of threat 10234. The time at which IP address 10231 and source MAC address 10232 are got is defined as timestamp 10233.

4. Configuration of Switch Operator

Figure 5:
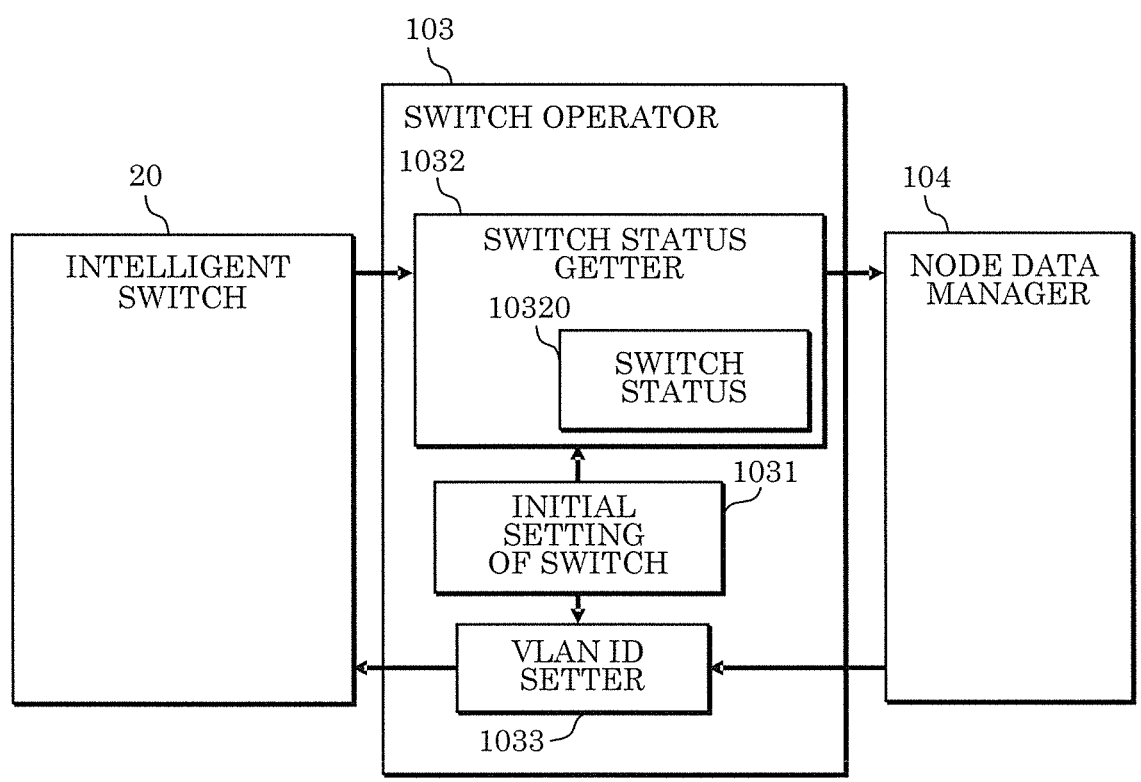
FIG. 5 is a diagram illustrating a configuration of a switch operator according to Embodiment 1.

Details of switch operator 103 will now be described. FIG. 5 is a diagram illustrating a configuration of switch operator 103 according to the present embodiment.

As illustrated in FIG. 5, switch operator 103 stores initial setting of switch 1031, which is setting information on intelligent switch 20. Switch operator 103 includes switch status getter 1032 and VLAN ID setter 1033.

Based on initial setting of switch 1031, switch status getter 1032 gets switch status 10320 held by intelligent switch 20, and outputs switch status 10320 to node data manager 104.

VLAN ID setter 1033 changes the setting of the VLAN of each port in intelligent switch 20 based on initial setting of switch 1031 and the notification from node data manager 104.

4-1. Configuration of Initial Setting of Switch

Figure 6:
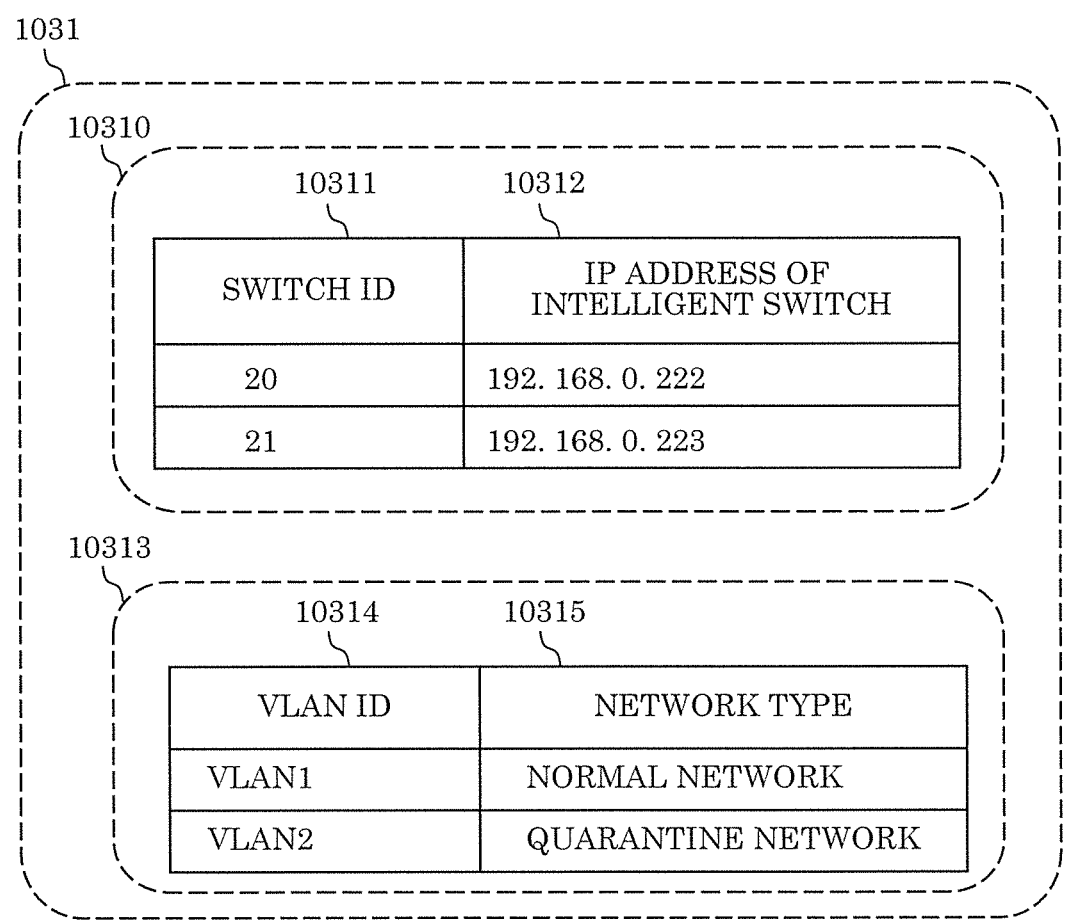
FIG. 6 is a diagram illustrating a configuration of initial setting of switch in Embodiment 1.

Details of initial setting of switch 1031 will now be described. FIG. 6 is a diagram illustrating a configuration of initial setting of switch 1031 according to the present embodiment. As illustrated in FIG. 6, initial setting of switch 1031 is composed of switch ID table 10310 in which switch ID 10311 is associated with IP address 10312 for controlling the switch and VLAN ID table 10313 in which VLAN ID 10314 is associated with network type 10315.

Switch ID 10311 is information for identifying each intelligent switch 20.

IP address 10312 for controlling the switch is used to control intelligent switch 20 through port 1 of intelligent switch 20 according to a simple network management protocol (SNMP).

VLAN ID 10314 is information for specifying (identifying) the VLAN. VLAN1 and VLAN2 are present in the present embodiment.

Network type 10315 is associated with VLAN ID 10314. For example, VLAN1 indicates a normal network in network type 10315, and VLAN2 indicates a quarantine network in network type 10315.

The normal network is a network not having threat remover 105 interposed between source node-b 302 and destination node-a 301.

The quarantine network is a network having threat remover 105 interposed between source node-b 302 and destination node-a 301.

4-2. Configuration of Switch Status

Details of switch status 10320 will now be described. FIG. 7 is a diagram illustrating a configuration of switch status 10320 according to the present embodiment. Switch status 10320 is generated by switch status getter 1032. Switch status getter 1032 outputs switch ID 10311, which is got from initial setting of switch 1031, as switch ID 10321, and gets connection port number 10322, VLAN ID 10323, and MAC address 10324 corresponding to switch ID 10321 from intelligent switch 20.

Connection port number 10322 is information indicating the port number of ports of intelligent switch 20 to which the nodes are connected.

5. Configuration of Node Data Manager

Figure 8:
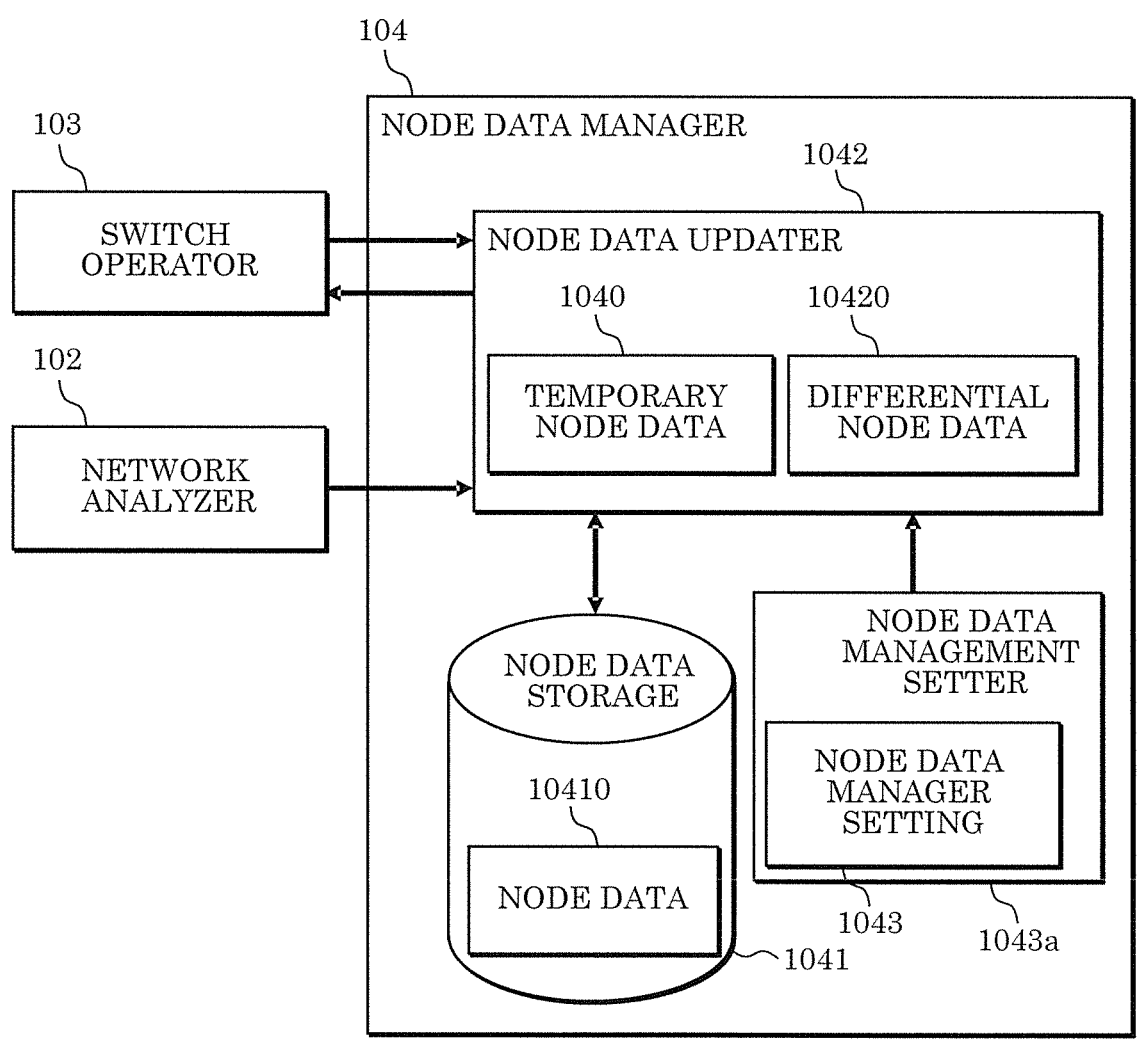
FIG. 8 is a diagram illustrating a configuration of a node manager according Embodiment 1.

Details of node data manager 104 in network protection device 10 will now be described. FIG. 8 is a diagram illustrating a configuration of node data manager 104 according to the present embodiment. As illustrated in FIG. 8, node data manager 104 manages node data 10410, which is the information of the node present in the target communication network. Node data manager 104 includes node data storage 1041 which stores node data 10410, node data updater 1042, and node data management setter 1043a.

Node data updater 1042 generates temporary node data 1040 based on node communication information 1023 in FIG. 4 got from network analyzer 102, switch status 10320 in FIG. 7 got from switch operator 103, and added threat score information 10430 in FIG. 9 described later. Node data updater 1042 generates differential node data 10420 based on temporary node data 1040 and node data 10410 stored in node data storage 1041. Node data updater 1042 notifies VLAN ID setter 1033 in switch operator 103 of differential node data 10420. Furthermore, node data updater 1042 updates node data 10410 stored in node data storage 1041, based on differential node data 10420.

Node data management setter 1043a is a storage which stores node data manager setting 1043.

5-1. Configuration of Node Data Manager Setting

Details of node data manager setting 1043 will now be described. FIG. 9 is a diagram illustrating a configuration of node data manager setting 1043 according to the present embodiment. As illustrated in FIG. 9, node data manager setting 1043 includes added threat score information 10430, and node data manager reference value information 10431 needed to update the VLAN setting of each port based on the threat score.

Added threat score information 10430 includes threat detection ID 104301, detected threat 104302, judgement 104303, and added threat score 104304.

Threat detection ID 104301 is the information indicating a result determined by one of source address checker 1020, flow analyzer 1021, and payload analyzer 1022 included in network analyzer 102. The results determined by these processors are represented by their reference numerals in threat detection ID 104301, and these reference numerals in the drawings are exemplary.

Threat detection ID 104301 can have any form as long as it is possible to identify the processor which outputs the result of determination. For example, a discriminable number may be given to the detected threat of a detector, and the detected threat may be identified using the discriminable number.

Detected threat 104302 indicates the detected threat associated with threat detection ID 104301. For example, when threat detection ID 104301 designates "1020", detected threat 104302 indicates that "new IP address:MAC address detection" and the IP address and the MAC address are not contained in node data storage 1041 in new source address 1011.

In judgement 104303, the case where the result of detection shown in detected threat 104302 is determined as a threat is defined as black, the case where the result of detection shown in detected threat 104302 might be a threat but cannot clearly be determined as a threat is defined as gray, and the case where there is no threat is defined as white.

In judgement 104303, the result of detection is defined using three levels as described above. Alternatively, another level of determination may be added as necessary, or the result of detection may be defined using two levels, that is, black and white.

Added threat score information 10430 can contain any other item than the items described above, or may use only part of the items described above. Added threat score information 10430 may use a combination of several detected threats 104302. All the nodes do not have to have the same added threat score 104304 in added threat score information 10430, and may have different added threat scores according to their roles and types.

Node data manager reference value information 10431 contains value title 104311 and value 104312. Value title 104311 contains "time t0 until threat score subtraction", "threat score X during changing from VLAN1 to VLAN2", "threat score Y during changing from VLAN2 to VLAN1", and "score Z to change the judgement of the threat level from gray to black". Threat score X is one example of the first value. Threat score Y is one example of the second value. Score Z is one example of the third value.

Value title 104311 in node data manager reference value information 10431 can contain any other item than the items described above, or may use part of the items described above. Instead of "time t0 until threat score subtraction", "channel capacity M0", "predetermined number P0 of communication packets", or "predetermined number S0 of TCP sessions" may be used, for example. In the case where value title 104311 uses "channel capacity M0" and "predetermined number P0 of communication packets", using the channel capacity and the number of communication packets, the source amount from destination node-a 301 may be measured or the source and reception amounts between source node-b 302 and destination node-a 301 may be measured.

Alternatively, value title 104311 may use a combination of any two or more of "time t0 until threat score subtraction", "channel capacity M0", "predetermined number P0 of communication packets", and "predetermined number S0 of TCP sessions". All the nodes do not have to have the same value 104312 in node data manager reference value information 10431, and may have different reference value according to their roles and types.

While node data manager setting 1043 should be set at the start of the operation of the communication network, node data manager setting 1043 may be changed after the start of the operation of the communication network according to the situation. Although not illustrated, node data updater 1042 may include an information display and an input for setting to perform the setting. For example, added threat score 104304 and value 104312 may be automatically changed using machine learning.

5-2. Configuration of Temporary Node Data

Figure 10:
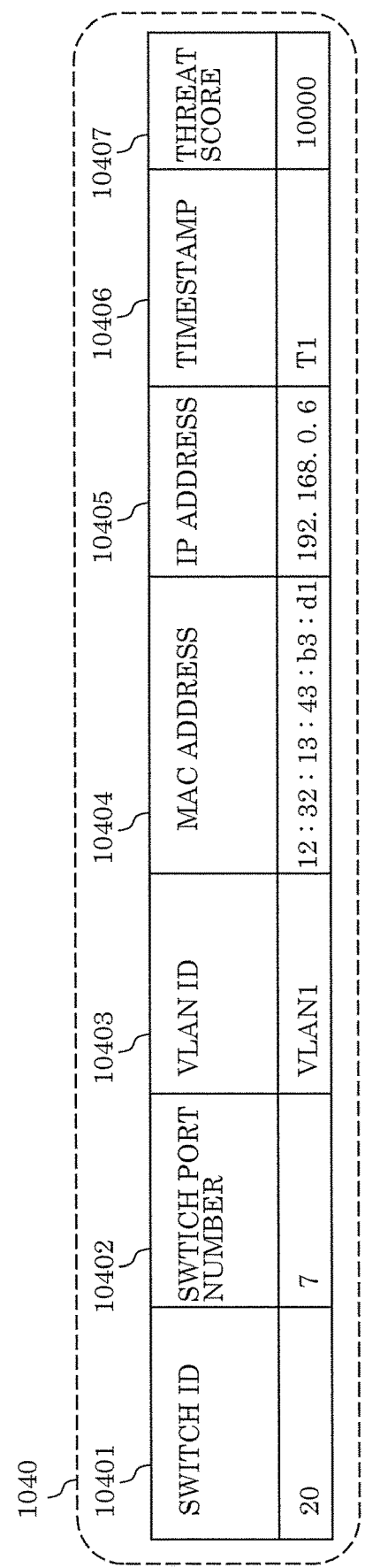
FIG. 10 is a diagram illustrating a configuration of temporary node data in Embodiment 1.

Details of temporary node data 1040 will now be described. FIG. 10 is a diagram illustrating a configuration of temporary node data 1040 according to the present embodiment. As illustrated in FIG. 10, temporary node data 1040 is managed by node data manager 104 in FIG. 8. Temporary node data 1040 contains switch ID 10401, switch port number 10402, VLAN ID 10403, MAC address 10404, IP address 10405, timestamp 10406, and threat score 10407.

5-3. Configuration of Differential Node Data

Details of differential node data 10420 will now be described. FIG. 11 is a diagram illustrating a configuration of differential node data 10420 according to the present embodiment. FIG. 11 illustrates the information after a threat from source node-b 302 is detected. Differential node data 10420 is managed by node data manager 104 and held by node data updater 1042.

Differential node data 10420 contains switch ID 10421, switch port number 10422, VLAN ID 10423, MAC address 10424, IP address 10425, timestamp 10426, and threat score 10427. Threat score 10427 indicates the degree of threat of packet 1010 calculated based on the added threat score in FIG. 9. Threat score 10427 is one example of the score.

5-4. Configuration of Node Data

Details of node data 10410 will now be described. FIGS. 12A and 12B are diagrams illustrating the configurations of node data 10410 according to the present embodiment. Node data 10410 in FIG. 12A corresponds to the information before a threat from source node-b 302 is detected, and node data 10410 in FIG. 12B corresponds to the information after a threat from source node-b 302 is detected.

As illustrated in FIGS. 12A and 12B, node data 10410 is managed by node data manager 104, and is stored in node data storage 1041. Node data 10410 contains node data ID 10411, switch ID 10412, switch port number 10413, VLAN ID 10414, MAC address 10415, IP address 10416, timestamp 10417, and threat score 10418.

A single ID is assigned to node data ID 10411. The single ID is composed of a set of switch ID 10412, switch port number 10413, VLAN ID 10414, and MAC address 10415 to discriminate this ID from an ID composed of another set thereof.

6. Configuration of Logical Network Before and after Threat is Detected

Figure 13A:
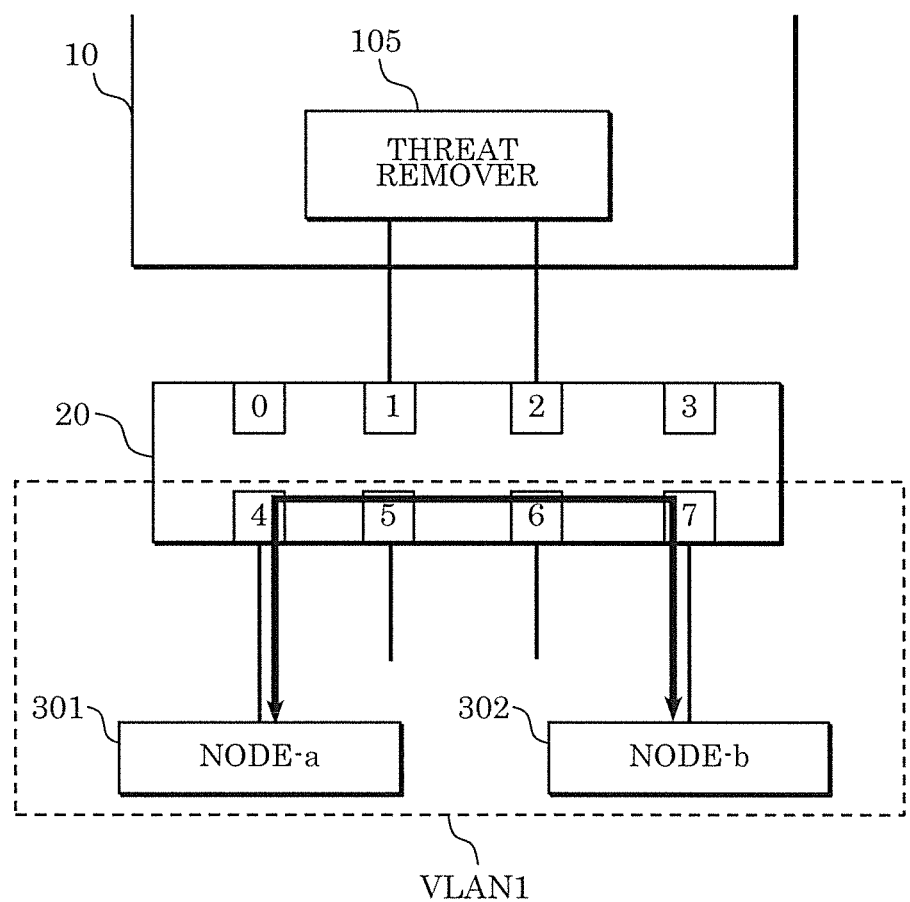
FIG. 13A is a diagram illustrating a configuration of a logical network of an entire network configuration in Embodiment 1.
Figure 13B:
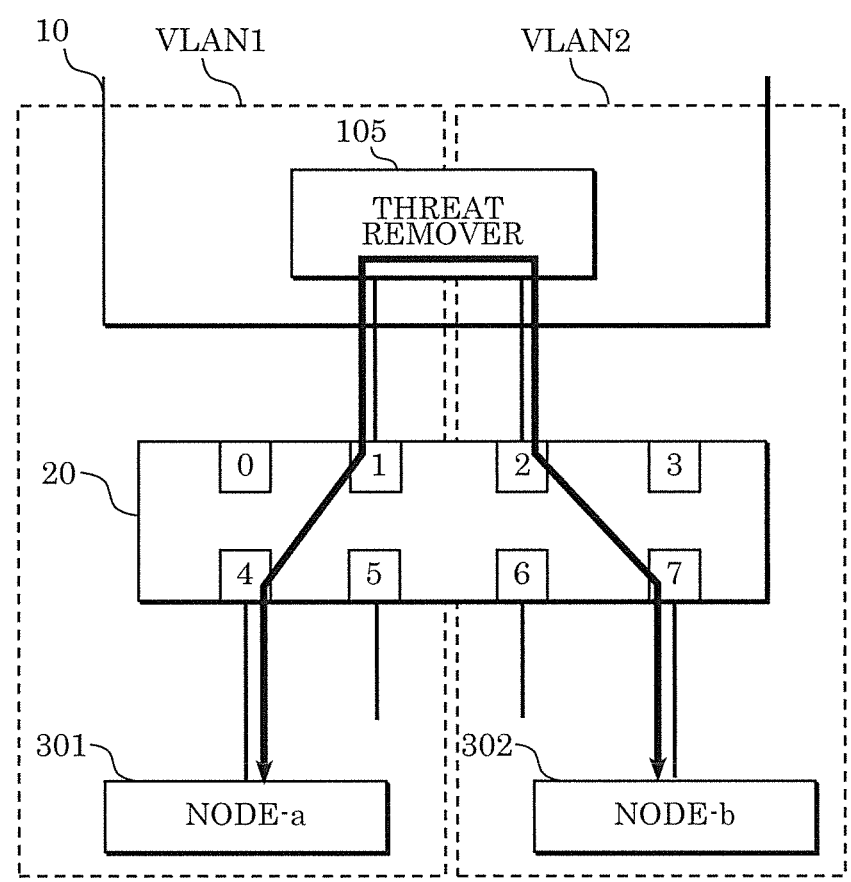
FIG. 13B is a diagram illustrating another configuration of a logical network of an entire network configuration in Embodiment 1.

Details of the entire configuration of the network before and after a threat from source node-b 302 is detected will now be described. FIGS. 13A and 13B are diagrams illustrating configurations of a logical network of an entire network configuration according to the present embodiment. FIG. 13A illustrates the entire configuration of a logical network before a threat from source node-b 302 is detected, and FIG. 13B illustrates the configuration of the logical network after a threat from source node-b 302 is detected. As illustrated in FIGS. 13A and 13B, threat remover 105 is connected through port 1 of intelligent switch 20 contained in VLAN1, and is connected through port 2 of intelligent switch 20 contained in VLAN2. For convenience, the LAN cable connecting port 0 of intelligent switch 20 to network protection device 10 is omitted in FIGS. 13A and 13B.

FIG. 13A illustrates a normal logical network before a threat from source node-b 302 is detected or after the threat is detected and an abnormal state is changed to a normal state. Destination node-a 301 and source node-b 302 both are contained in VLAN1, and communicate with each other without threat remover 105. In other words, VLAN1 in FIG. 13A forms a normal network where destination node-a 301 is connected to source node-b 302 through intelligent switch 20 and a threat is not removed from packet 1010. The term "an abnormal state is changed to a normal state" indicates recovery of a normal state from an abnormal state.

Source node-b 302, ports 7 and 4 of intelligent switch 20, and destination node-a 301 form one example of the first communication path, and belong to VLAN1. The path composed of source node-b 302, ports 7 and 4 of intelligent switch 20, and destination node-a 301 is in a normal state before a threat is detected.

FIG. 13B illustrates an abnormal logical network after the threat from source node-b 302 is detected and before an abnormal state is changed to a normal state.

Destination node-a 301 is connected to threat remover 105 while being connected to VLAN1. Source node-b 302 is switched from VLAN1 to VLAN2 in its connection, and is connected to threat remover 105. Thereby, source node-b 302 communicates with destination node-a 301 through threat remover 105. Threat remover 105 removes the threat from packet 1010 concerning source node-b 302, and transmits the packet after the removal of the threat to destination node-a 301, that is, the packet after correction, through intelligent switch 20.

Source node-b 302, ports 7 and 2 of intelligent switch 20, and threat remover 105 which belong to VLAN2 and threat remover 105, ports 1 and 4 of intelligent switch 20, and destination node-a 301 which belong to VLAN1 form one example of the second communication path. The path composed of source node-b 302, ports 7 and 2 of intelligent switch 20, threat remover 105, and threat remover 105, ports 1 and 4 of intelligent switch 20, and destination node-a 301 which belong to VLAN1 is in the abnormal state before a threat is detected. Port 1 and port 2 are one example of the second port and the third port, respectively.

As illustrated in FIG. 13A, switch operator 103 of network protection device 10 then changes the abnormal network in the abnormal state to the normal network in the normal state. Source node-b 302 then performs normal communication with destination node-a 301.

7. Operation of Network Protection Device

Figure 14:
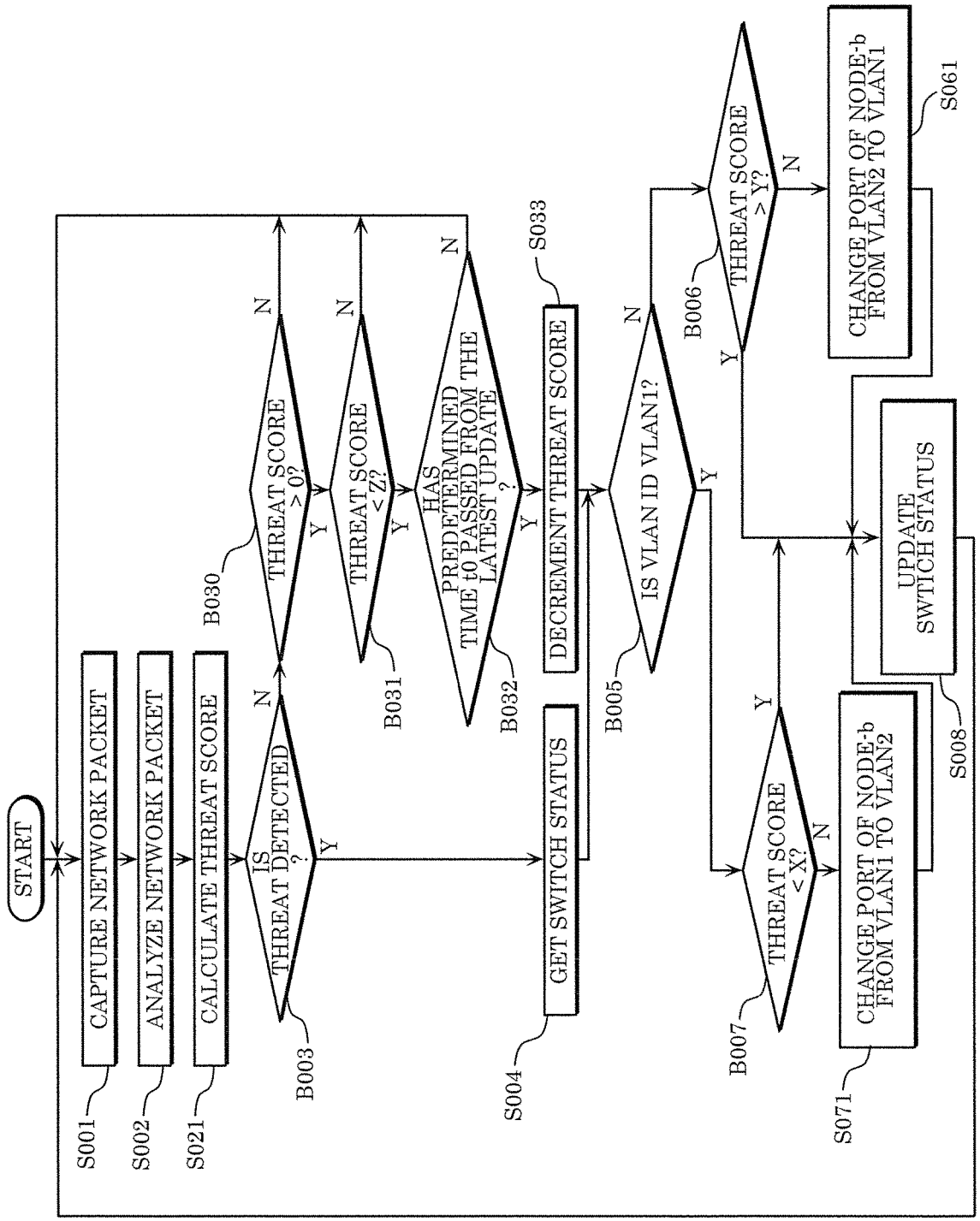
FIG. 14 is a flowchart illustrating an operation of the network protection device according to Embodiment 1.

Details of the operation of network protection device 10 will now be described. FIG. 14 is a flowchart illustrating an operation of network protection device 10 according to the present embodiment.

As illustrated in FIG. 14, network protection device 10 captures packet 1010 communicated between source node-b 302 and destination node-a 301 (step S001). Specifically, network protection device 10 captures a copy of packet 1010 in the promiscuous mode through a LAN cable connected to port 0 of intelligent switch 20.

Packet capture unit 101 in network protection device 10 outputs packet 1010 captured on the target communication network to network analyzer 102.

Network analyzer 102 analyzes packet 1010 (step S002). Based on packet 1010, network analyzer 102 generates pieces of threat detection information, which are the results of determination determined by using source address checker 1020, flow analyzer 1021, and payload analyzer 1022, respectively. Network analyzer 102 generates node communication information 1023 based on the respective pieces of threat detection information.

Source address checker 1020 extracts node communication information 1023 of source node-b 302 from packet 1010, and specifies IP address 10231, MAC address 10232, and timestamp 10233 of source node-b 302.

In the case where destination address 1012 matches with that of the destination to which access is prohibited, filter of destination blacklist 10211 in flow analyzer 1021 detects the case as abnormality of security. In the case where destination address 1012 does not match with that of the destination to which access is permitted, filter of destination whitelist 10212 detects the case as abnormality of security. Furthermore, in the case where there are attempts to access to a large number of IP addresses inside the network from the destination IP address, IP scan detector 10213 detects the case as abnormality of security. In the case where there are attempts to access to a large number of ports to a specific IP address inside the network from the destination port, port scan detector 10214 detects the case as abnormality of security.

In the case where payload 1013 has a pattern to attach the vulnerability of the software incorporated in destination node-a 301, vulnerability attack detector 10221 in payload analyzer 1022 detects the case as abnormality of security. In the case where payload 1013 contains a pattern indicating malware, malware detector 10222 detects the case as abnormality of security. In the case where there are a large number of repetitions of authentication attempts and failures from a specific node to a node requiring authentication within a predetermined period of time, authentication failure detector 10223 detects the case as abnormality of security.

Network analyzer 102 then transmits node communication information 1023 to node data manager 104.

Node data updater 1042 generates temporary node data 1040 from node communication information 1023, node data 10410, and added threat score information 10430 in node data manager setting 1043.

MAC address 10404 uses MAC address 10232 in node communication information 1023. IP address 10405 uses IP address 10231 in node communication information 1023. Timestamp 10406 uses timestamp 10233 in node communication information 1023.

Node data updater 1042 searches for a combination containing MAC address 10404 and IP address 10405 from node data 10410. When such a combination is found, node data updater 1042 outputs switch ID 10401 as switch ID 10412, switch port number 10402 as switch port number 10413, and VLAN ID 10403 as VLAN ID 10414. Based on added threat score information 10430, node data management setter 1043a outputs threat score 10407 as added threat score 104304, which corresponds to detected threat 104302 matching with type of threat 10234 (step S021).

From node data 10410, node data updater 1042 searches for a combination containing MAC address 10404 and IP address 10405. When such a combination is not found, node data updater 1042 outputs "1000" of added threat score 104304, which corresponds to "new IP:MAC detection" in detected threat 104302 shown in added threat score information 10430 in node data manager setting 1043, as threat score 10407 (step S021). Here, switch ID 10401, switch port number 10402, and VLAN ID 10403 remain unspecified.

Network analyzer 102 determines whether a threat is detected or not (branch B003). Specifically, vulnerability attack detector 10221 detects abnormality of security in the cases where packet 1010 has a pattern to attack the vulnerability of the software. Malware detector 10222 detects abnormality of security in the case where a pattern indicating malware is contained. Authentication failure detector 10223 detects abnormality of security in the case where authentication failures are repeated.

When a threat is not detected (N in branch B003), that is, the threat score is less than score Z, node data manager 104 generates differential node data 10420, and performs determination in the next step from the value of threat score 10407.

Node data manager 104 generates differential node data 10420 based on temporary node data 1040 and node data 10410. At this time, switch ID 10421 is output as switch ID 10401, switch port number 10422 as switch port number 10402, VLAN ID 10423 as VLAN ID 10403, MAC address 10424 as MAC address 10404, IP address 10425 as IP address 10405, and timestamp 10426 as timestamp 10406. Node data manager 104 calculates threat score 10427 by adding threat score 10418 to threat score 10407.

Node data updater 1042 in node data manager 104 determines whether threat score 10427 in differential node data 10420 is greater than 0 or not (branch B030). When threat score 10427 is 0 (N in branch B030), node data updater 1042 returns to step S001, and captures the next packet 1010. When threat score 10427 is greater than 0 (Y in branch B030), node data updater 1042 determines whether threat score 10427 is less than score Z to change the judgement of the threat level from gray to black (hereinafter, referred to as score Z) or not (branch B031).

When threat score 10427 is equal to or greater than score Z (N in branch B031), node data updater 1042 determines the threat level as black, returns to step S001, and captures the next packet 1010. When threat score 10427 is less than score Z (Y in branch B031), node data updater 1042 determines the threat level as gray, and determines whether time t0 has passed from the last timestamp or not by comparing timestamp 10417 in node data 10410 with timestamp 10426 in differential node data 10420 (branch B032).

Here, time t0 is the same as defined in value title 104311 in node data manager reference value information 10431, and should be determined before the operation of communication. Time t0 may be a fixed value, such as 5 minutes, or may be varied based on some reference according to changes in situations after the operation of communication.

Alternatively, instead of the determination in branch B032, the determination may be performed using channel capacity M0, predetermined number P0 of communication packets, and predetermined number S0 of TCP sessions, for example. In the case of channel capacity M0 and number P0 of communication packets, using the channel capacity and the number of communication packets, the source amount from source node-b 302 may be measured or the source and reception amounts between source node-b 302 and destination node-a 301 may be measured.

Alternatively, a combination of time t0, channel capacity M0, predetermined number P0 of communication packets, and predetermined number S0 of TCP sessions may be used in the determination in branch B032. The values shown in value 104312 in node data manager reference value information 10431 are exemplary, and may be set at different values according to the role.

When time t0 has not passes (N in branch B032), node data updater 1042 returns to step S001, and captures the next packet 1010. When time t0 has passed since the last timestamp (Y in branch B032), node data updater 1042 obtains threat score 10427 in differential node data 10420 by subtracting 1 from threat score 10427 in node data 10410 (step S033).

Although the subtracted value is 1 here, the subtracted value may be varied according to the type of the detected threat and the role of the node. The subtracted value may be a value of a predetermined proportion of the threat score, and may be any other value than 1.

When a threat is detected (Y in branch B003), that is, the threat score is equal to or greater than score Z, switch status getter 1032 in switch operator 103 gets the latest switch status 10320 from intelligent switch 20 (step S004). Switch status getter 1032 outputs the latest switch status 10320 to node data manager 104. Node data updater 1042 updates switch ID 10421, switch port number 10422, and VLAN ID 10423 of differential node data 10420.

Here, switch status getter 1032 can get the latest switch status 10320 through port 1 of intelligent switch 20 using SNMP, for example. Alternatively, switch status getter 1032 may get the latest switch status 10320 with a dedicated communication line, rather than SNMP, for example.

Node data updater 1042 determines whether VLAN ID 10423 of differential node data 10420 is VLAN1 or not (branch B005). When the VLAN is VLAN2 (N in branch B005), the step goes to branch B006. When the VLAN is VLAN1 (Y in branch B005), the step goes to branch B007.

Node data updater 1042 determines whether threat score 10427 of differential node data 10420 is greater than threat score Y used in updating from VLAN2 to VLAN1 or not (branch B006).

When threat score 10427 is greater than threat score Y (Y in branch B006), the step goes to step S008 without switching VLAN including switch port number 10422 by VLAN ID setter 1033. When threat score 10427 is equal to or less than threat score Y (N in branch B006), the step goes to step S061.

Node data updater 1042 determines whether threat score 10427 of differential node data 10420 is less than threat score X used in switching from VLAN1 to VLAN2 or not (branch B007). When threat score 10427 is less than threat score X (Y in branch B007), the step goes to step S008. When threat score 10427 is equal to or greater than threat score X (N in branch B007), the step goes to step S071.

Here, threat score X used in branch B007 and threat score Y used in branch B006 may be the same value, or may be different values.

As illustrated in FIGS. 5, 11, and 14, VLAN ID setter 1033 switches the VLAN including switch port number 10422 from VLAN2 to VLAN1 based on VLAN ID 10423 in differential node data 10420 (step S061). In step S061, source node-b 302 to be quarantined is returned from the quarantine network to the normal network, and VLAN2 to which source node-b 302 in FIG. 13B belongs is switched such that source node-b 302 belongs to VLAN1 in FIG. 13A.

FIG. 13A illustrates the logical network in a state before a threat from source node-b 302 is detected where the threat score of node data manager reference value information 10431 is below threat score X in FIG. 9, or in a state after a state where the threat score of node data manager reference value information 10431 exceeds threat score Y in FIG. 9 is changed to a state where the threat score is equal to or less than threat score Y.

VLAN ID setter 1033 can set the VLAN of the port in the switch through port 1 of intelligent switch 20 by SNMP, for example. Alternatively, VLAN ID setter 1033 may set the VLAN using a dedicated communication line rather than SNMP.

Based on VLAN ID 10423 of differential node data 10420, VLAN ID setter 1033 switches the VLAN to which switch port number 10422 belongs from VLAN1 to VLAN2 (step S071).

In step S071, the VLAN is switched such that source node-b 302 which belongs to the normal network belongs to the quarantine network, that is, VLAN1 to which source node-b 302 in FIG. 13A belongs is switched to VLAN2 in FIG. 13B.

FIG. 13B illustrates the logical network in a state after the threat from source node-b 302 is detected, where the state where the threat score of node data manager reference value information 10431 is below threat score X in FIG. 9 is changed to a state where the threat score is equal to or greater than threat score X and remains above threat score Y in node data manager reference value information 10431 in FIG. 9.

Node data updater 1042 updates node data 10410 based on differential node data 10420 (step S008). Specifically, node data updater 1042 checks whether switch ID 10412 matches with switch ID 10421, switch port number 10413 with switch port number 10422, VLAN ID 10414 with VLAN ID 10423, MAC address 10415 with MAC address 10424, and IP address 10416 with IP address 10425. When all of these pairs are matched, node data updater 1042 updates timestamp 10417 of the management ID having these matched combinations to timestamp 10426, and updates threat score 10418 to threat score 10427. In contrast, when not all of these pairs are matched, node data updater 1042 assigns a new management ID, and sets switch ID 10412 for switch ID 10421, switch port number 10413 for switch port number 10422, VLAN ID 10414 for VLAN ID 10423, MAC address 10415 for MAC address 10424, IP address 10416 for IP address 10425, timestamp 10417 for timestamp 10426, and threat score 10418 for threat score 10427. Node data updater 1042 thus updates the information, and then returns to step S001 to capture the next packet 1010. FIG. 12B illustrates the case where node data 10410 in the state of FIG. 12A is updated according to differential node data 10420 in FIG. 11. Node data updater 1042 then returns the processing to step S001.

7-1. Operation to Update Threat Score

Figure 15:
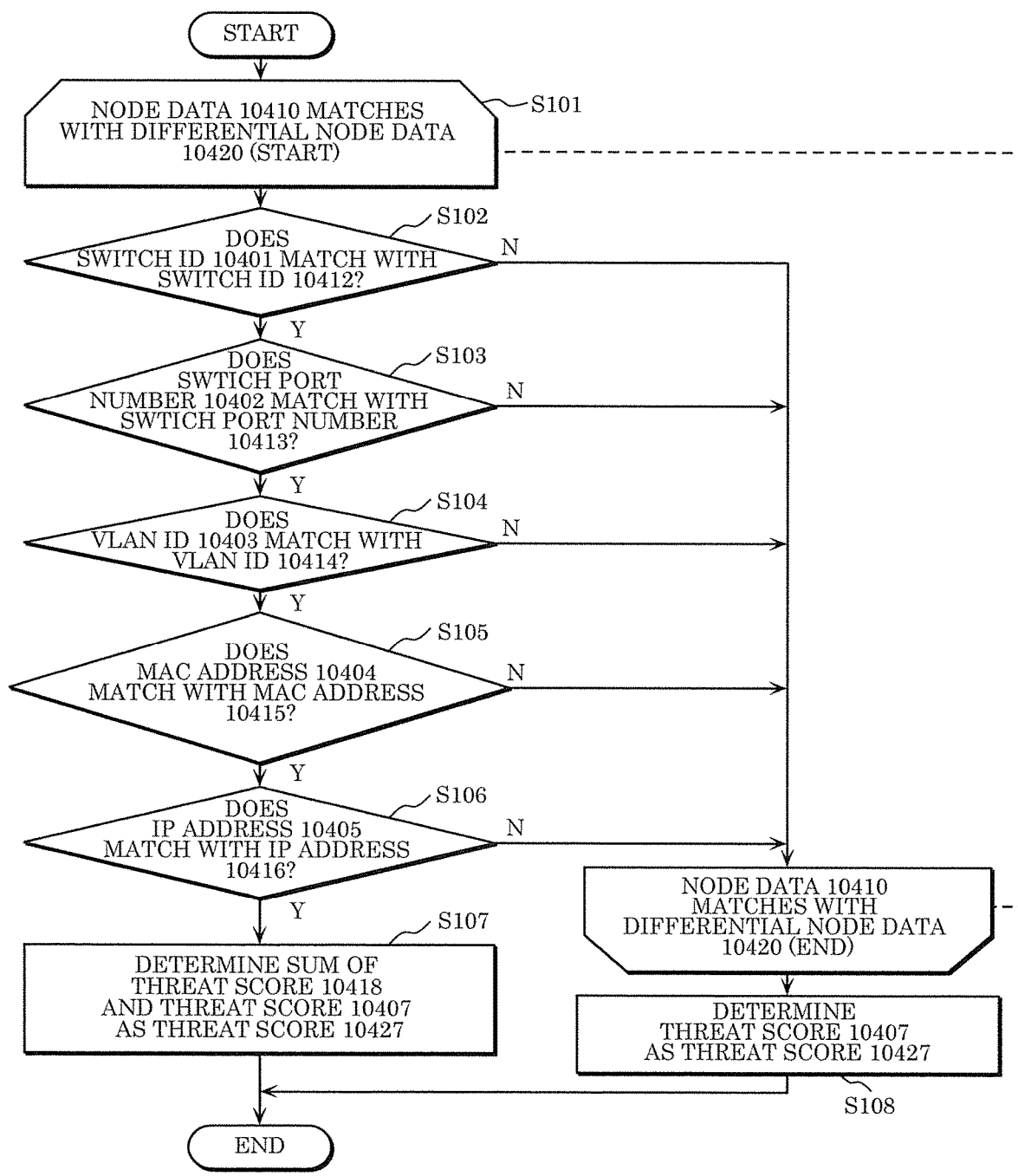
FIG. 15 is a flowchart illustrating an operation to update threat score in Embodiment 1.

Details of the operation to update the threat score will now be described. FIG. 15 is a flowchart illustrating the processing to update the threat score in the present embodiment. FIG. 15 illustrates the processing to update threat score 10427 of differential node data 10420 in branch B003 in FIG. 14.

As illustrated in FIG. 15, node data updater 1042 checks whether node data 10410 completely matches with differential node data 10420 or not. This check is performed by the following loop processing from step S102 to step S106 repeated by node data updater 1042 (S101). Specifically, node data updater 1042 checks all of the management IDs in node data 10410 whether a combination of switch ID 10401, switch port number 10402, VLAN ID 10403, MAC address 10404, and IP address 10405 in temporary node data 1040 is contained or not.

Node data updater 1042 determines whether switch ID 10401 matches with switch ID 10412 or not (step S102). No match between switch ID 10401 and switch ID 10412 (N in step S102) indicates that the management ID is not contained, i.e., temporary node data 1040 is not contained in node data 10410. Node data updater 1042 determines threat score 10407 as threat score 10427 of differential node data 10420 (step S108). Node data updater 1042 then terminates the processing.

When there is a match (Y in step S102), node data updater 1042 determines whether switch port number 10402 matches with switch port number 10413 or not (step S103). When there is no match (N in step S103), the processing of node data updater 1042 goes to step S108.

When there is a match (Y in step S103), node data updater 1042 determines whether VLAN ID 10403 matches with VLAN ID 10414 or not (step S104). When there is no match (N in step S104), the processing of node data updater 1042 goes to step S108.

When there is a match (Y in step S104), node data updater 1042 determines whether MAC address 10404 matches with MAC address 10415 or not (step S105). When there is no match (N in step S105), the processing of node data updater 1042 goes to step S108.

When there is a match (Y in step S105), node data updater 1042 determines whether IP address 10405 matches with IP address 10416 or not (step S106). When there is no match (N in step S106), the processing of node data updater 1042 goes to step S108.

When there is a match (Y in step S106), node data updater 1042 determines the sum of threat score 10418 of the corresponding management ID and threat score 10407 of temporary node data 1040 as threat score 10427 of differential node data 10420 (step S107). Node data updater 1042 then terminates the processing.

7-2. Operation to Update Mode Data

Figure 16:
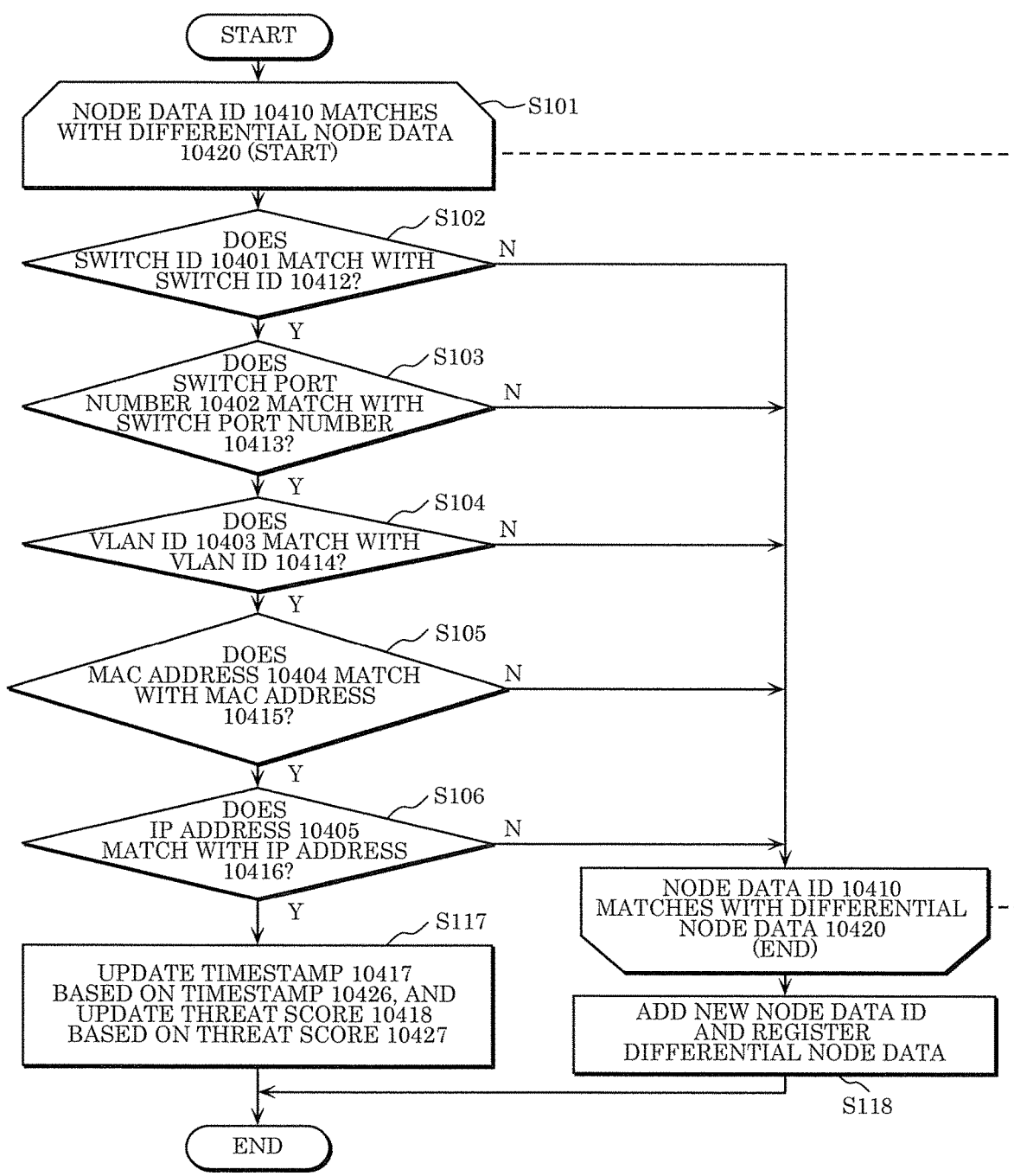
FIG. 16 is a flowchart illustrating an operation to update node data in Embodiment 1.

Details of the operation to update node data 10410 will now be described. FIG. 16 is a flowchart illustrating the processing to update the node data in the present embodiment. FIG. 16 illustrates the processing to update node data 10410 in S009 of FIG. 14. The same reference numerals will be given to the same processings as those in FIG. 15, and the description thereof will be omitted.

As illustrated in FIG. 16, node data updater 1042 performs the following loop processing where steps S102 to S106 are repeated (S101). When all the items in node data 10410 are completely matched in the processing from steps S102 to S106 (Y in step S106), node data updater 1042 updates timestamp 10417 in FIG. 12A of the corresponding management ID based on timestamp 10426, and updates threat score 10418 in FIG. 12A based on threat score 10427 (step S117). Node data updater 1042 then terminates the processing.

When the management ID contained is not found (when temporary node data 1040 is not contained in node data 10410), node data updater 1042 adds a new management ID to register the differential node data (step S118). Node data updater 1042 then terminates the processing.

8. Operation of Threat Remover

Threat remover 105 is connected to both of VLAN1 and VLAN2. Threat remover 105 removes packet 1010 including a threat from the communication between destination node-a 301 belonging to VLAN1 and source node-b 302 belonging to VLAN2. Alternatively, threat remover 105 has a function to pass normal packet 1010 obtained by creating a harmless version of packet 1010 including a threat from communication between destination node-a 301 belonging to VLAN1 and source node-b 302 belonging to VLAN2, for example, by discarding hazardous part of packet 1010 or rewriting the hazardous part into a harmless part.

In an embodiment, threat remover 105 may behave in a mode called a transparent mode where threat remover 105 behaves such that it is not present as a node on the communication network. In this case, the communication can be continued as it is even when the VLAN of source node-b 302 is switched.

Network protection device 10 may behave as a router between VLAN1 and VLAN2 in an embodiment. In this case, threat remover 105 may behave as source node-b 302 during the communication from destination node-a 301 to source node-b 302, and may behave as destination node-a 301 during the communication from source node-b 302 to destination node-a 301. Specifically, ARP commands may be used.

9. Effects of Embodiment

In the present embodiment, a threat can be detected by network analyzer 102 which continuously monitors a copy of packet 1010 via intelligent switch 20. When a threat is detected, the switch operator can logically disconnect the communication network (VLAN2) to which destination node-a 301 belongs and which may contain the threat from the communication network (VLAN1) to which source node-b 302 belongs. In other words, threat remover 105 is logically connected to the boundary between VLAN2 to which source node-b 302 belongs and which may contain the threat and VLAN1 to which destination node-a 301 belongs. Thereby, the threat can be removed from packet 1010 that is transmitted from source node-b 302 and may contain the threat. Thus, the spreading of abnormality of security can be prevented without imparting adverse influences to normal communication.

Moreover, network analyzer 102 which detects a threat is disconnected from threat remover 105 which removes the threat in order to continue the normal communication between the communication network to which source node-b 302 belongs and the communication network to which destination node-a 301 belongs. Such a configuration can minimize the processing loads of these processors. Thereby, the threat can be detected through searching by network analyzer 102 before the threat is executed, and then the threat can be removed by threat remover 105. As a result, threats to the security can be treated at earlier stages.

Accordingly, the fault-tolerant operation of the nodes needed for a control system network such as factories can be provided and the delay of communication therebetween can be minimized. Moreover, the security level can be improved by monitoring threats inside the communication network or preventing the spreading of threats.

10. Other Modifications of Embodiment 1

Although the present disclosure has been described based on the embodiment above, Embodiment 1 is not limitative to the present disclosure, and Modification 1 of Embodiment 1 and Modification 2 of Embodiment 1 are also included in the present disclosure.

Figure 17A:
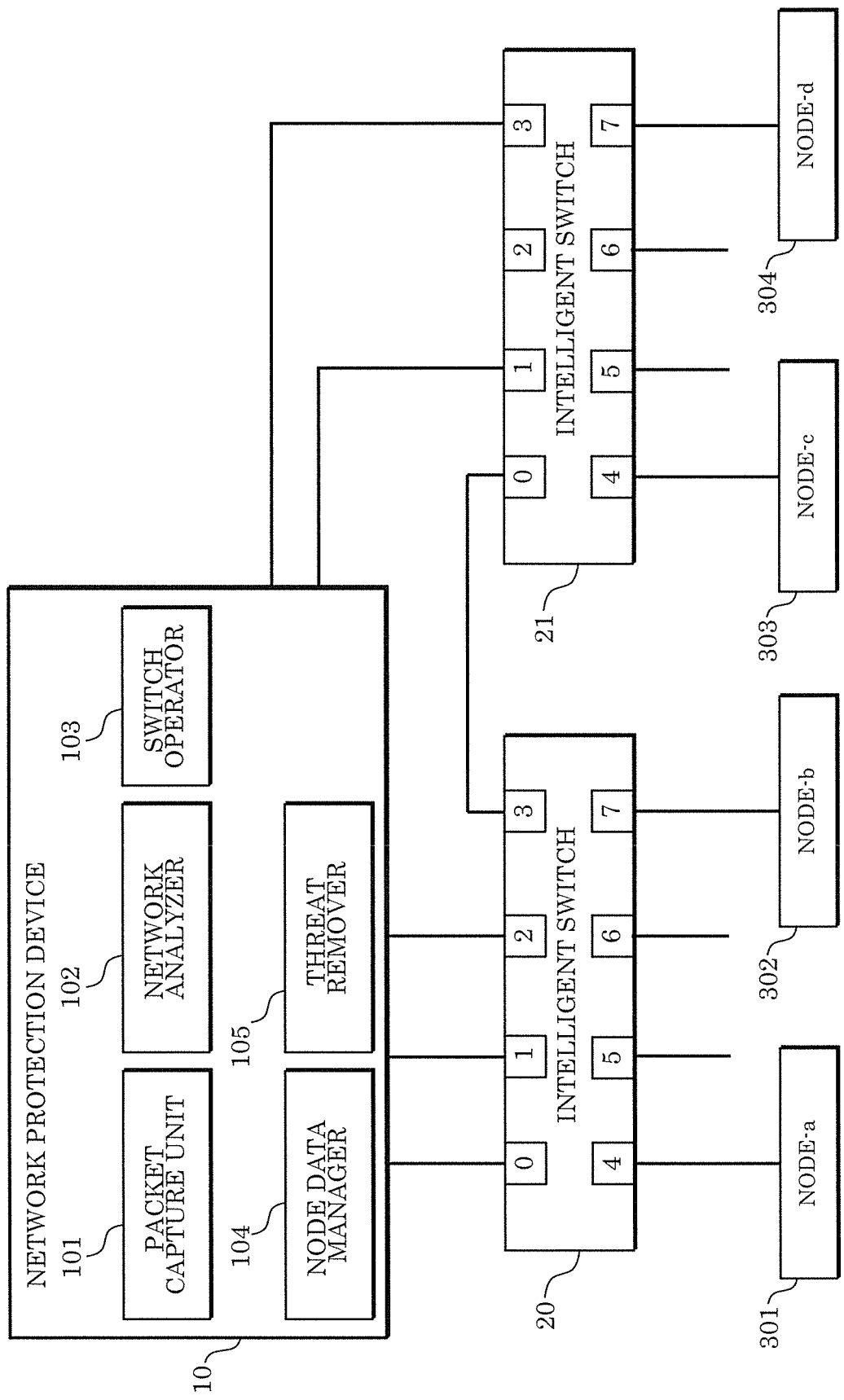
FIG. 17A is a diagram illustrating an entire configuration of another communication network, to which a network protection device according to Modification 1 of Embodiment 1 belongs.

Modification 1 of Embodiment 1 (hereinafter, referred to as the present modification) will be described. While FIG. 1 illustrates the entire configuration of the network where a single intelligent switch 20 is connected to network protection device 10, the network may have a configuration where multiple intelligent switches are connected thereto. FIG. 17A is a diagram illustrating an entire configuration of a communication network to which network protection device 10 according to the present modification belongs.

As illustrated in FIG. 17A, the communication network includes network protection device 10, intelligent switch 20, destination node-a 301, source node-b 302, intelligent switch 21, destination node-c 303 (receiver node), and source node-d 304 (sender node) connected through LAN cables.

In this communication network, port 3 of intelligent switch 20 is connected to port 0 of intelligent switch 21 with a LAN cable. In the communication network, network protection device 10 is connected to port 1 and port 3 of intelligent switch 21 through LAN cables.

At the start of the communication operation between source node-d 304 and destination node-c 303, intelligent switch 21 sets ports 0, 4, and 7 of intelligent switch 21 to VLAN1 and port 1 to VLAN2, and sets port 3 connected to network protection device 10 to a mirror function. Packet capture unit 101 also captures packet 1010 from port 3 of intelligent switch 21. For example, commands for controlling intelligent switch 21 are communicated between network protection device 10 and port 1 of intelligent switch 21.

Figure 17B:
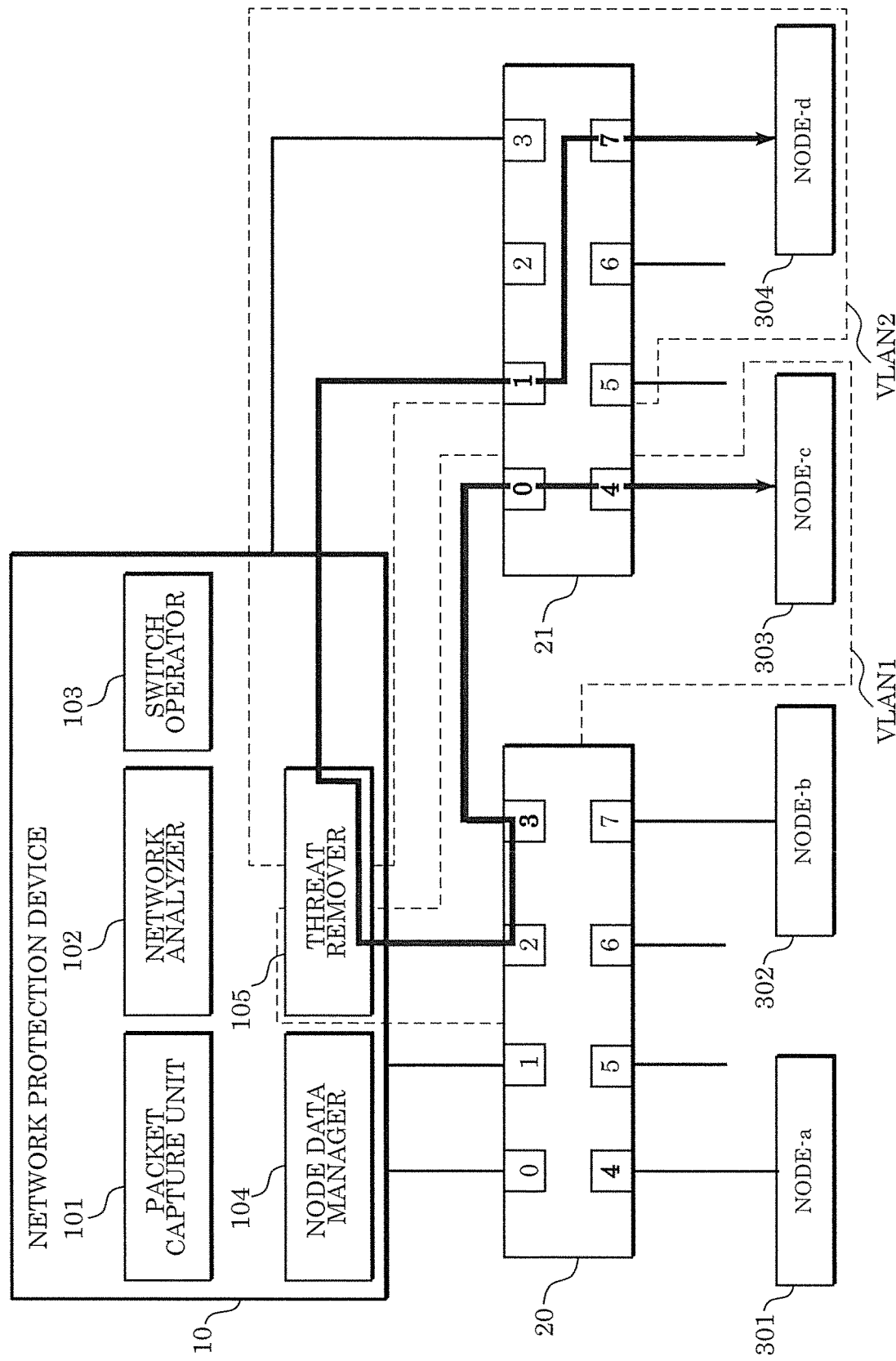
FIG. 17B is a diagram illustrating a case where a sender node communicates with a receiver node through a quarantine network in Modification 1 of Embodiment 1.

The operation of the communication network is as described in FIG. 13A above in the case where source node-d 304 communicates with destination node-c 303 in the normal network. When network analyzer 102 detects a threat from packet 1010, the communication is performed in the quarantine network as illustrated in FIG. 17B. FIG. 17B is a diagram illustrating a case where the sender node communicates with the receiver node in the quarantine network in the present modification. Switch operator 103 logically disconnects the communication network (VLAN2) to which source node-d 304 belongs and which may contain the threat from the communication network (VLAN1) to which destination node-c 303 belongs.

Specifically, switch operator 103 performs switching such that source node-d 304 belongs to VLAN2 where source node-d 304 is connected to threat remover 105 in network protection device 10 through ports 7 and 1 of intelligent switch 21 and threat remover 105 in network protection device 10 belongs to VLAN1 where threat remover 105 is connected to destination node-c 303 through ports 2 and 3 of intelligent switch 20 and ports 0 and 4 of intelligent switch 21. Thus, source node-d 304 is connected to destination node-c 303 through ports 7 and 1 of intelligent switch 21, network protection device 10, ports 2 and 3 of intelligent switch 20, and ports 0 and 4 of intelligent switch 21.

Figure 17C:
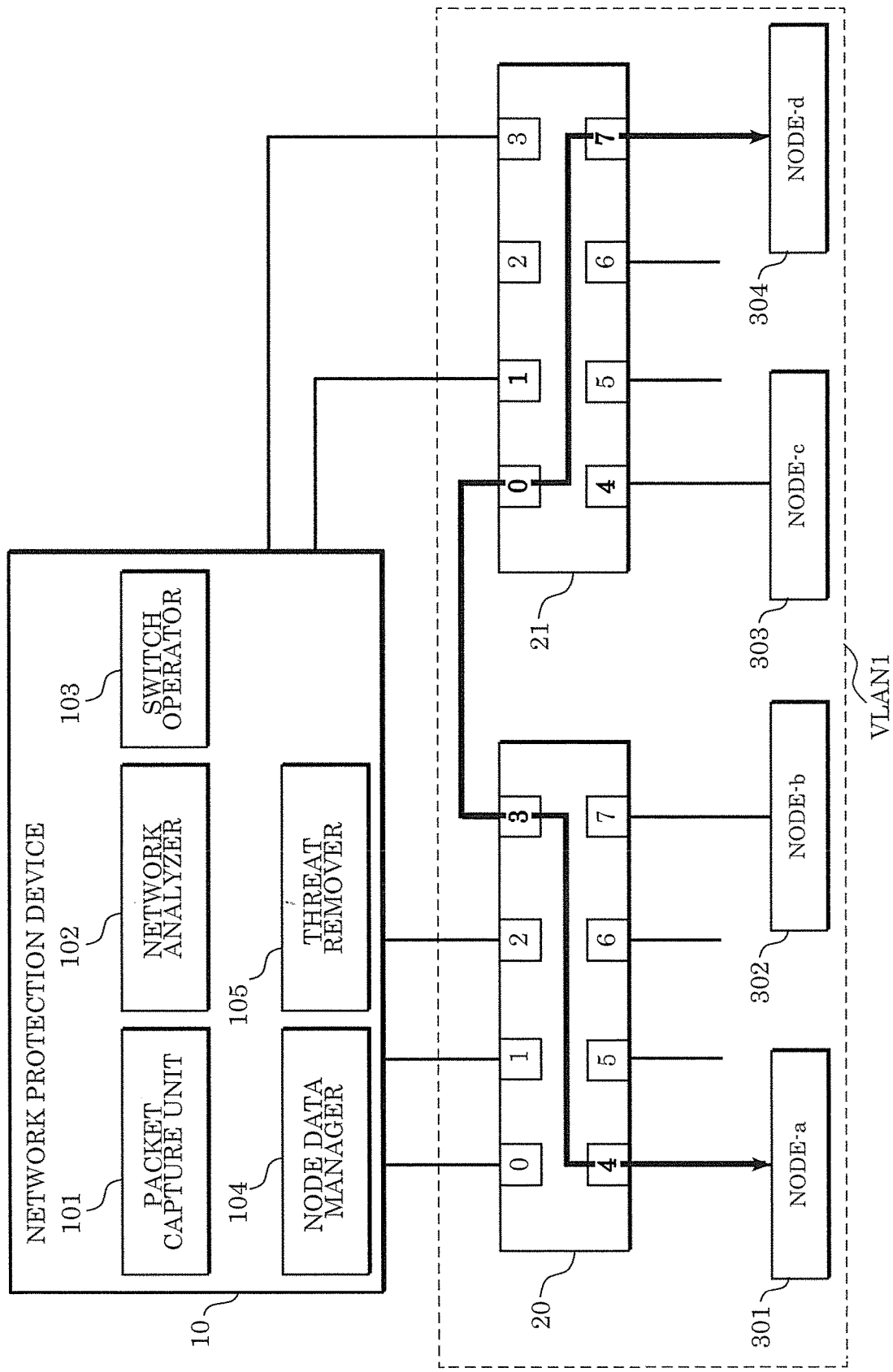
FIG. 17C is a diagram illustrating a case where a sender node communicates with a receiver node through a normal network in Modification 1 of Embodiment 1.

Alternatively, as illustrated in FIG. 17C, source node-d 304 is connected to destination node-a 301 through ports 7 and 0 of intelligent switch 21 and ports 3 and 4 of intelligent switch 20 when source node-d 304 communicates with destination node-a 301 in the normal network. FIG. 17C is a diagram illustrating a case where the sender node communicates with the receiver node in the normal network in Modification 1 of Embodiment 1. Although not illustrated, when source node-d 304 communicates with destination node-a 301 in the quarantine network, switch operator 103 performs switching such that source node-d 304 belongs to VLAN2 where source node-d 304 is connected to threat remover 105 in network protection device 10 through ports 7 and 0 of intelligent switch 21 and ports 3 and 2 of intelligent switch 20 and threat remover 105 in network protection device 10 belongs to VLAN1 where threat remover 105 is connected to destination node-a 301 through ports 0 and 4 of intelligent switch 20.

Network protection device 10 according the present modification having such a configuration enables the fault-tolerant operation of the nodes forming the communication network, and can improve the security level of the network while minimizing the delay of communication between multiple nodes, such as sender nodes 302 and 304 and receiver nodes 301 and 303.

The path represented by the bold solid line in FIG. 17B is one example of the second communication path, and the path represented by the bold solid line in FIG. 17C is one example of the first communication path.

Figure 18:
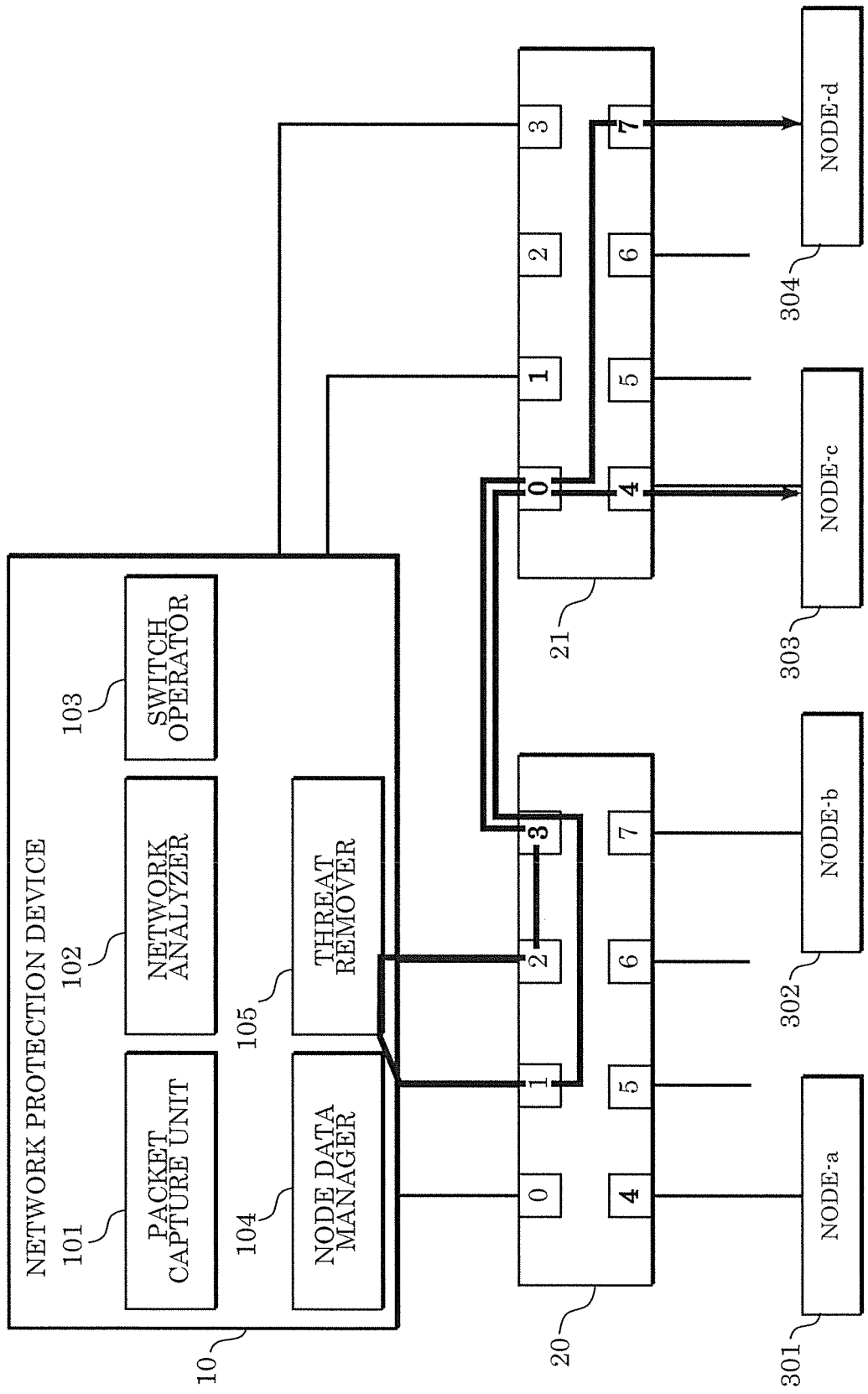
FIG. 18 is a diagram illustrating an entire configuration of another communication network, to which a network protection device according to Modification 2 of Embodiment 1 belongs.
Figure 19:
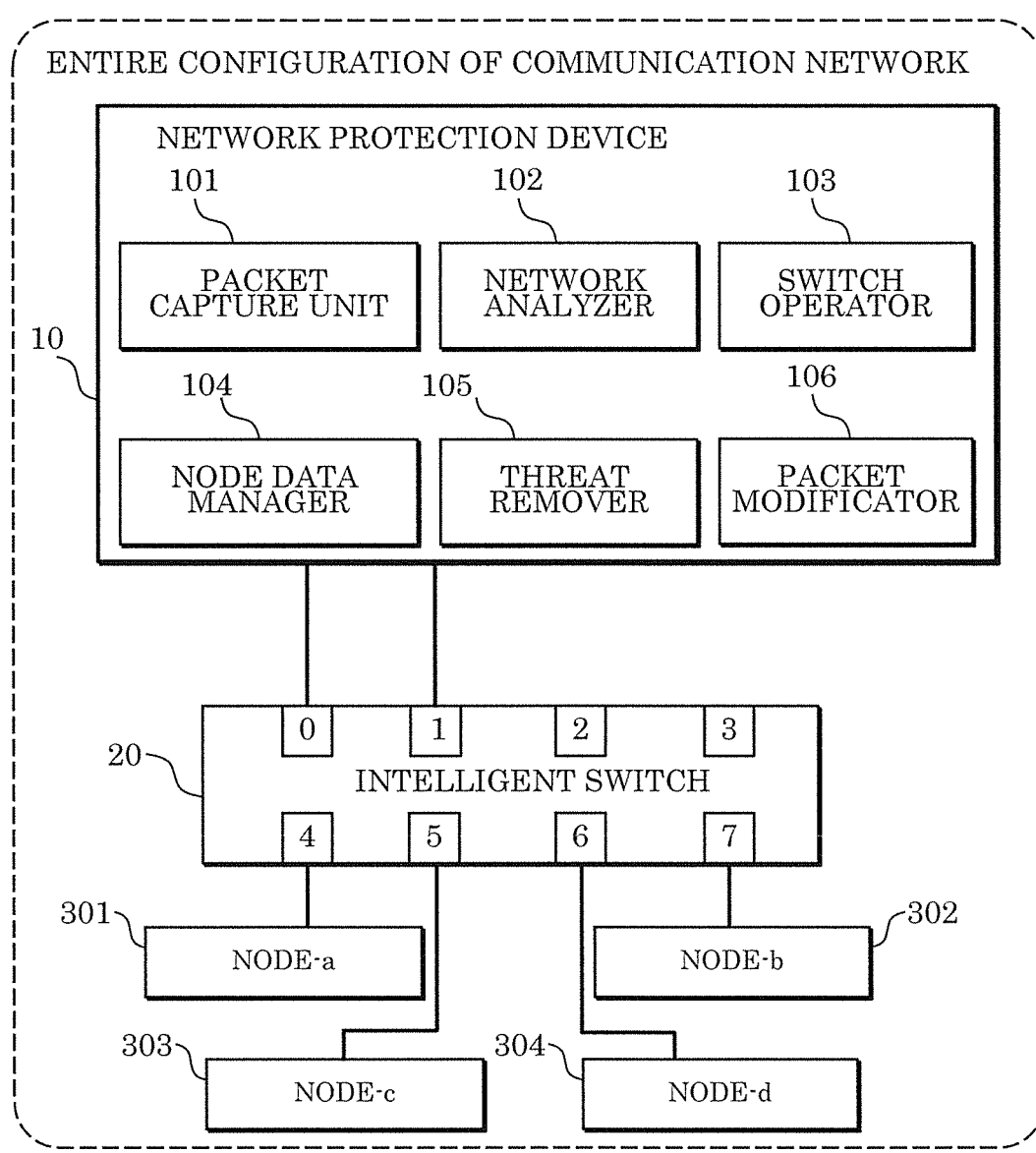
FIG. 19 is a diagram illustrating an entire configuration of a communication network, to which a network protection device according to Embodiment 2 belongs.

Modification 2 of Embodiment 1 (hereinafter, referred to as the present modification) will be described. The communication network may have an entire configuration different from that in FIG. 17A where multiple intelligent switches are connected to network protection device 10. FIG. 18 is a diagram illustrating an entire configuration of the communication network to which network protection device 10 according to the present modification belongs.

As illustrated in FIG. 18, the communication network includes network protection device 10, intelligent switch 20, destination node-a 301, source node-b 302, intelligent switch 21, destination node-c 303, and source node-d 304 connected with LAN cables.

In this communication network, port 3 of intelligent switch 20 is connected to port 0 of intelligent switch 21 through LAN cables. A mirror function may be set in a port not connected to intelligent switch 21 as necessary, and the port may be connected to network protection device 10.

At the start of the communication operation between source node-d 304 and destination node-c 303, intelligent switch 21 sets port 3 of intelligent switch 20 and port 0 of intelligent switch 21 at a trunk line and sets ports 4 and 7 of intelligent switch 21 to VLAN1.

The operation is as described above in FIG. 13A in the case where source node-d 304 communicates with destination node-c 303 in the normal network. In the case where the communication is performed in the quarantine network, switch operator 103 performs switching such that source node-d 304 belongs to VLAN2 (represented by the bold solid line) where source node-d 304 is connected to threat remover 105 in network protection device 10 through ports 7 and 0 of intelligent switch 21 and threat remover 105 in network protection device 10 belongs to VLAN1 where threat remover 105 is connected to destination node-c 303 through ports 1 and 3 of intelligent switch 20, and ports 0 and 4 of intelligent switch 21. The path illustrated in FIG. 18 is one example of the first communication path.

Network protection device 10 having such a configuration can protect the communication network connected to multiple intelligent switches (intelligent switch 20 and intelligent switch 21 in the present modification).

Embodiment 2

[Configuration]

Other configurations in Embodiment 2 are the same as those in Embodiment 1 unless otherwise specified. The same reference numerals will be given to the same configurations, and the detailed description thereof will be omitted.

21. Entire Configuration of Communication Network

Network protection device 10 includes packet capture unit 101, network analyzer 102, switch operator 103, node data manager 104, and threat remover 105, and further includes packet modificator 106.

Port 0 of intelligent switch 20 has a mirror function enabling the output of a copy of packet 1010 passing through intelligent switch 20. Port 1 includes a tag port function to add tag information for distinguishing VLAN groups to packet 1010. Ports 2 to 7 are standard ports which behave similarly to ports for standard switching hubs. Port 1 is one example of the sixth port.

Network protection device 10 is connected to port 0 and port 1 of intelligent switch 20. Destination node-a 301 is connected to port 4, source node-b 302 to port 7, destination node-c 303 to port 5, and source node-d 304 to port 6. Port 7 is one example of the fifth port. Port 4 is one example of the seventh port.

Source node-b 302, ports 4 and 7 of intelligent switch 20, and destination node-a 301 belong to VLAN1*a*. Source node-d 304, port 5, port 6, and destination node-c 303 belong to VLAN1*b* different from VLAN1*a*. Although sender nodes 302 and 304 and receiver nodes 301 and 303 are connected to the same intelligent switch 20, communication cannot be performed between different VLANs, i.e., between VLAN1*a* and VLAN1*b*.

The communication path connecting port 1 of intelligent switch 20 to network protection device 10 is a trunk line, and transmits and receives packet 1010 by distinguishing multiple VLAN groups, such as VLAN1*a* and VLAN1*b*. Tag information for specifying a VLAN group is inserted into packet 1010. In the present embodiment, port 2 of intelligent switch 20 is not connected to network protection device 10.

When standard ports 4 to 7 receive packet 1010 and destination node-a 301 having an address contained in packet 1010 is not connected to the same port as the port to which VLAN belongs (hereinafter, referred to as a current VLAN), intelligent switch 20 adds tag information indicating the current VLAN of destination node-a 301 to packet 1010, and transmits packet 1010 from a tag port, i.e., port 1.

When port 1 as a tag port receives packet 1010, intelligent switch 20 refers to the tag information indicating the current VLAN and contained in packet 1010, and selects a standard port which belongs to the VLAN group corresponding to the tag information. Intelligent switch 20 removes the tag information from packet 1010, and transmits packet 1010 to destination node-a 301 through the port connected to destination node-a 301.

22. Configuration of Network Protection Device

Details of network protection device 10 will now be described.

When switching the VLAN of the port, switch operator 103 switches from VLAN1*a* or VLAN1*b* to VLAN2*a* or VLAN2*b* (later illustrated in FIGS. 25A and 25B) or from VLAN2*a* or VLAN2*b* to VLAN1*a* or VLAN1*b*, for example. Here, VLAN1*a* and VLAN1*b* are normal networks and VLAN2*a* and VLAN2*b* are quarantine networks. For example, destination node-a 301 belongs to VLAN1*a*, source node-b 302 to VLAN2*a*, destination node-c 303 to VLAN1*b*, and source node-d 304 to VLAN2*b*.

Threat remover 105 has a function to receive packet 1010 concerning the node belonging to VLAN2*a* or VLAN2*b*, remove a threat from packet 1010, and then output the data to an original destination node-a 301 or destination node-c 303.

Packet modificator 106 changes the VLAN ID of the communication network included in the packet from which the threat is removed and which passes through threat remover 105. Specifically, after a threat is removed from the packet input from port 1 and the packet after the removal of the threat passes through threat remover 105, packet modificator 106 changes (updates) current VLAN ID 1011*a* of the packet from VLAN1*a* or VLAN1*b* to VLAN2*a* or VLAN2*b* or from VLAN2*a* or VLAN2*b* to VLAN1*a* or VLAN1*b*. After such rewriting, packet modificator 106 again transmits the changed packet to port 1 of intelligent switch 20. Packet modificator 106 is one example of the rewriter.

22-1. Configuration of Packet

Figure 20:
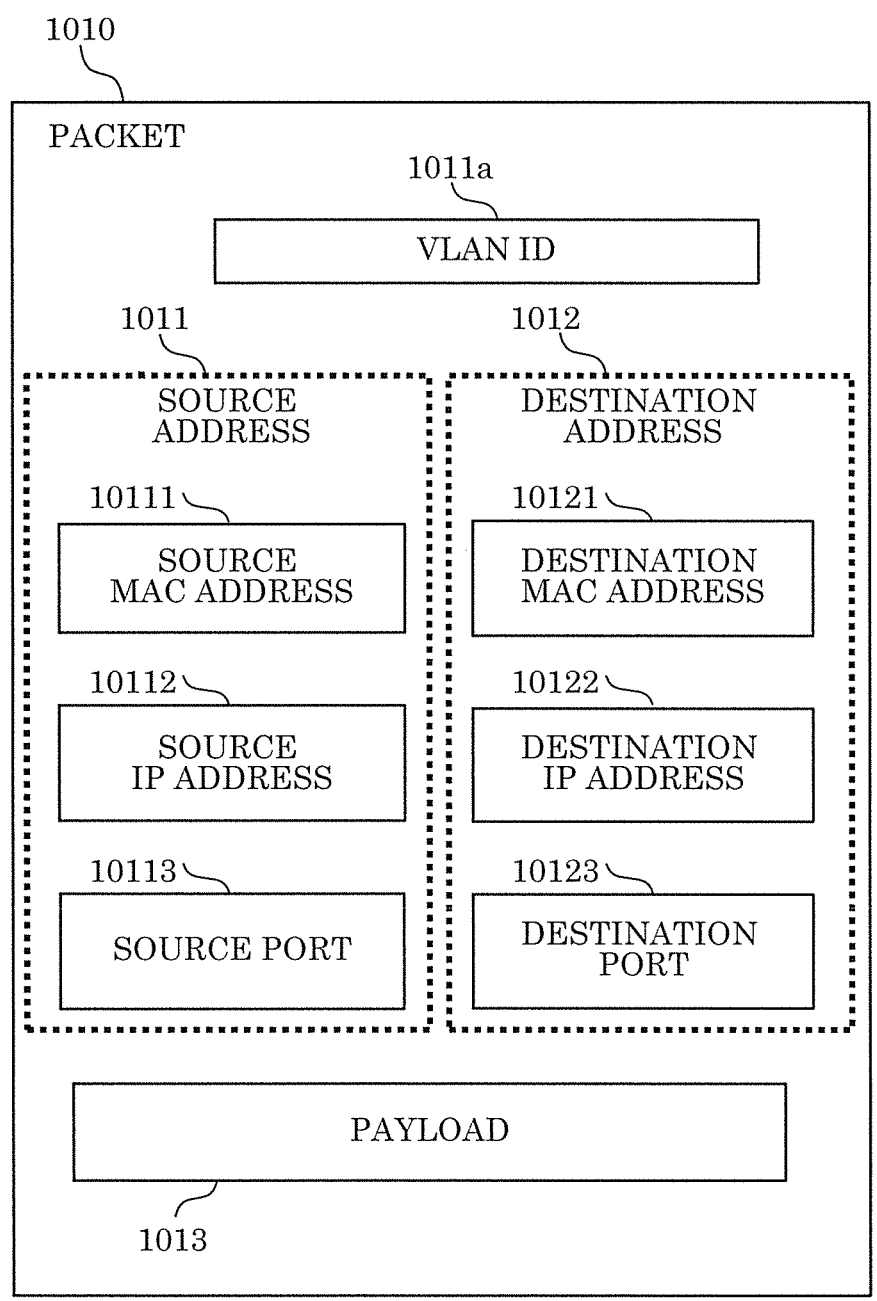
FIG. 20 is a diagram illustrating a configuration of a network packet in Embodiment 2.

FIG. 20 is a diagram illustrating a configuration of packet 1010 according to the present embodiment. Packet 1010 includes at least current VLAN ID 1011*a*, source address 1011, destination address 1012, and payload 1013.

Current VLAN ID 1011*a* is the tag information specified by IEEE 802.1Q, for example. Current VLAN ID 1011*a* is inserted into the Ethernet frame, and is used to identify the VLAN.

23. Configuration of Node Communication Information

Details of node communication information 1023 will now be described. FIG. 21 is a diagram illustrating a configuration of node communication information 1023 according to the present embodiment.

As illustrated in FIG. 21, node communication information 1023 includes node ID 10230, IP address 10231, MAC address 10232, VLAN ID 10232*a*, timestamp 10233, and type of threat 10234.

Current VLAN ID 1011*a* got from source address checker 1020 is defined as VLAN ID 10232*a*. The times at which IP address 10231, source MAC address 10232, and VLAN ID 10232*a* are got are defined as timestamp 10233.

24. Configuration of Initial Setting of Switch

Figure 22:
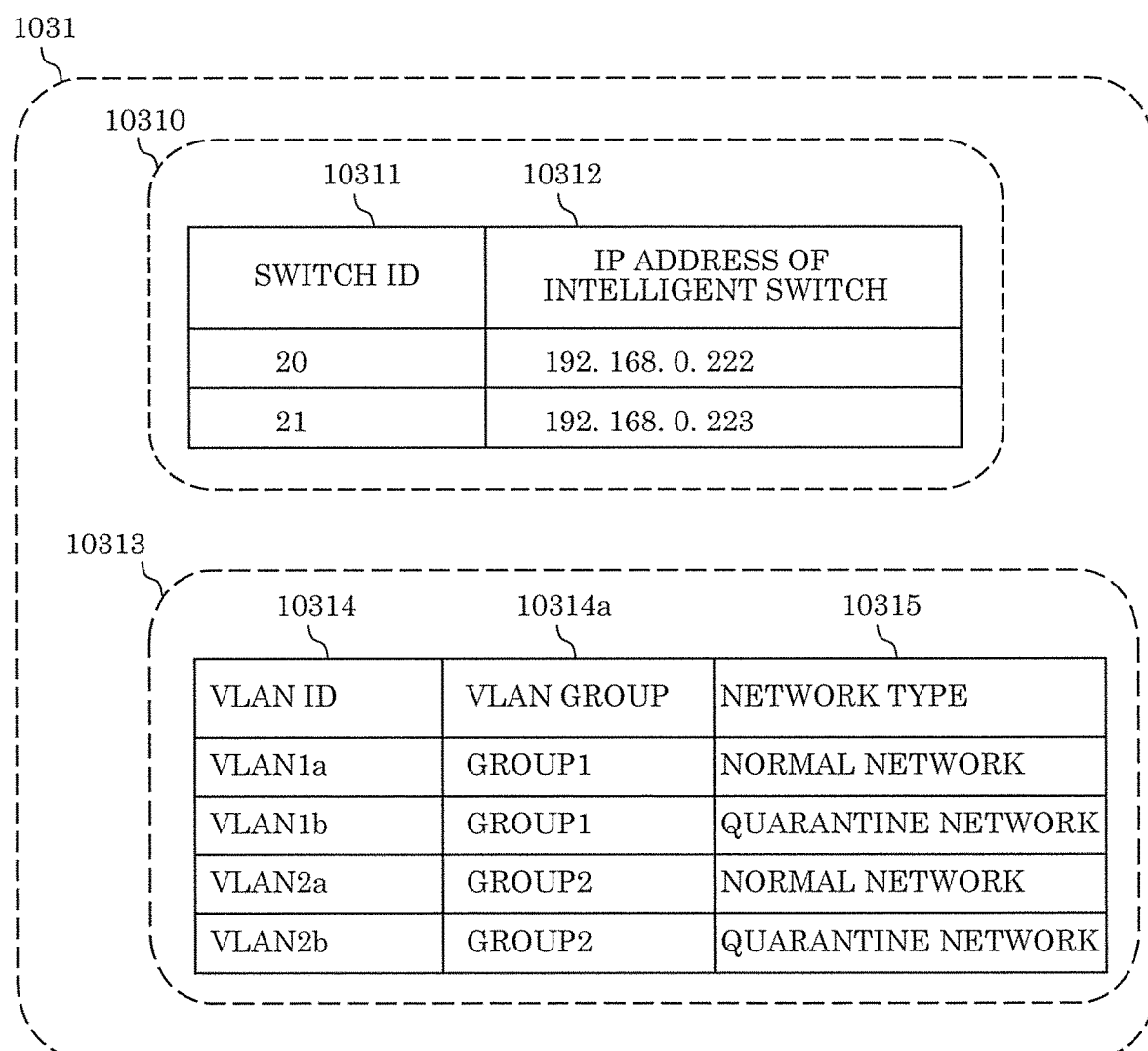
FIG. 22 is a diagram illustrating a configuration of initial setting of switch in Embodiment 2.

Details of initial setting of switch 1031 will now be described. FIG. 22 is a diagram illustrating a configuration of initial setting of switch 1031 according to the present embodiment.

As illustrated in FIG. 22, initial setting of switch 1031 includes switch ID table 10310 including switch ID 10311 associated with IP address 10312 for controlling the switch, and VLAN ID table 10313 including VLAN ID 10314 associated with VLAN group 10314*a* and network type 10315.

VLAN ID 10314 defined in VLAN ID table 10313 is set as the target VLAN outputting packet 1010 in the trunk line, which is port 1 of intelligent switch 20.

VLAN group 10314*a* is the information assigned to the each of VLAN1*a*, VLAN1*b*, VLAN2*a*, and VLAN2*b* and indicating the groups to which VLAN1*a*, VLAN1*b*, VLAN2*a*, and VLAN2*b* belong, respectively. VLAN group 10314*a* is associated with VLAN ID 10314 assigned to the network in advance.

VLAN group 10314*a* may be the information detected by network analyzer 102 and having a different detected threat. Alternatively, network analyzer 102 may be set so as to detect a threat only with specific VLAN group 10314*a*.

Node data manager reference value information 10431 contains value title 104311 and value 104312. Value title 104311 contains "time t0 until threat score subtraction", "threat score X when the VLAN network type is changed from the normal network to the quarantine network", "threat score Y when the VLAN network type is changed from the quarantine network to the normal network", and "score Z to change the judgement of the threat level from gray to black".

25. Configuration of Node Data

Details of node data 10410 will now be described. FIGS. 24A and 24B are diagrams illustrating configurations of node data 10410 according to the present embodiment. Node data 10410 in FIG. 24A indicates the information before a threat from source node-b 302 is detected, and node data 10410 in FIG. 24B indicates the information after the threat from source node-b 302 is detected.

26. Configuration of Logical Network Before and after Threat is Detected

Figure 25A:
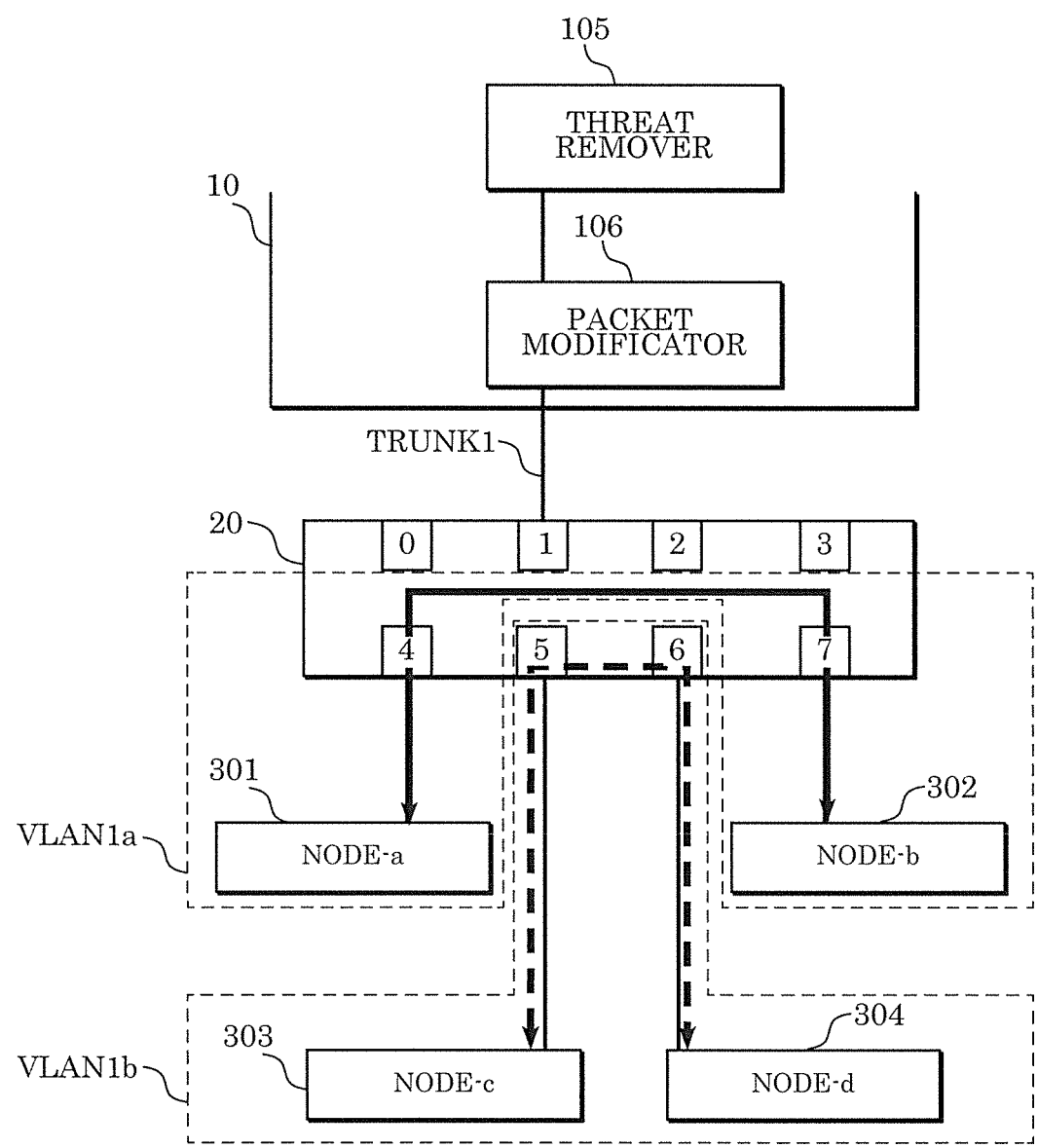
FIG. 25A is a diagram illustrating a configuration of a logical network of an entire network configuration in Embodiment 2.
Figure 25B:
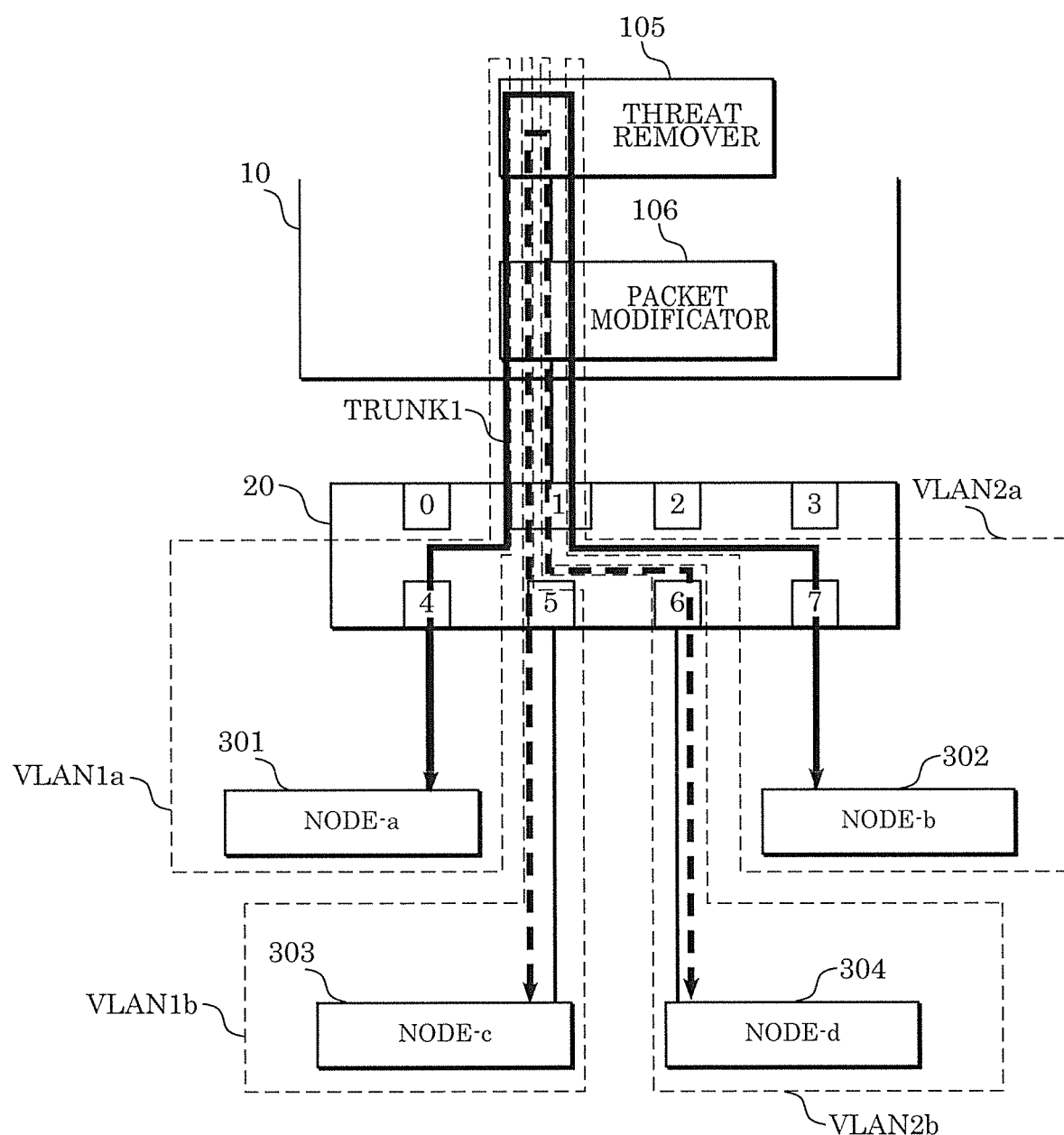
FIG. 25B is a diagram illustrating another configuration of a logical network of an entire network configuration in Embodiment 2.

Details of the entire configuration of the network before and after the threat from source node-b 302 is detected will now be described. FIGS. 25A and 25B are diagrams illustrating configurations of a logical network of the entire network configuration according to the present embodiment. FIG. 25A illustrates the logical network configuration before a threat from source node-b 302 is detected, and FIG. 25B illustrates the logical network configuration after the threat from source node-b 302 is detected. As illustrated in FIGS. 25A and 25B, threat remover 105 and packet modificator 106 are connected through port 1 of intelligent switch 20 set in trunk line TRUNK1. For convenience, the LAN cable connecting port 0 of intelligent switch 21 to network protection device 10 is omitted in FIGS. 25A and 25B.

FIG. 25A illustrates the logical network in a state before a threat from source node-b 302 or source node-d 304 is detected where the threat score of node data manager reference value information 10431 is below threat score X in FIG. 9, or a state after a state where the threat score of node data manager reference value information 10431 exceeds threat score Y in FIG. 9 changes to a state where the threat score is equal to or less than threat score Y.

Destination node-a 301, port 4, port 7, and source node-b 302 all are contained in VLAN1*a*, and destination node-c 303, port 5, port 6, and source node-d 304 all are contained in VLAN1*b*. These communicate with each other without threat remover 105 and packet modificator 106.

Destination node-a 301 remains connected to VLAN1*a*. Source node-b 302 is connected to VLAN2*a* by switching port 7 connected to intelligent switch 20 from VLAN1*a* to VLAN2*a* by switch operator 103. Destination node-a 301 communicates with source node-b 302 through threat remover 105 and packet modificator 106.

Destination node-c 303 remains connected to VLAN1*b*. Source node-d 304 is connected to VLAN2*b* by switching port 6 connected to intelligent switch 20 from VLAN1*b* to VLAN2*b*. Destination node-c 303 communicates with source node-d 304 through threat remover 105 and packet modificator 106.

The paths represented by the bold solid line and by the bold dashed line in FIG. 25A are one examples of the first communication path.

As illustrated in FIGS. 20 and 25B, when the setting of VLAN of the port is switched, intelligent switch 20 inserts current VLAN ID 1011*a* into packet 1010 input from port 7 or port 6 (tags packet 1010 with current VLAN ID 1011*a*), and outputs the packet from port 1 to network protection device 10 through trunk line TRUNK1.

Threat remover 105 in network protection device 10 removes a threat from packet 1010 concerning source node-b 302 and source node-d 304. After the threat is removed, packet modificator 106 refers to VLAN ID table 10313 about current VLAN ID 1011*a* in packet after the removal of the threat, and changes the VLAN ID from the normal network to the quarantine network or from the quarantine network to the normal network, for example, from VLAN1*a* to VLAN2*a*, from VLAN2*a* to VLAN1*a*, from VLAN1*b* to VLAN2*b*, or from VLAN2*b* to VLAN1*b*.

The packet having the changed VLAN ID passes through trunk line TRUNK1 to return to port 1 of intelligent switch 20. Intelligent switch 20 refers to current VLAN ID 1011*a* of the changed packet, and determines the destination port of the changed packet. At the same time, intelligent switch 20 deletes current VLAN ID 1011*a* from the changed packet.

Intelligent switch 20 transmits the packet from destination port after current VLAN ID 1011*a* is deleted.

The paths represented by the bold solid line and the bold dashed line in FIG. 25B are one examples of the second communication path.

Thus, without changing the processings of the nodes, source node-b 302 can perform normal communication with destination node-a 301, and source node-d 304 can perform normal communication with destination node-c 303.

Although the case where the threats from source node-b 302 and source node-d 304 are simultaneously detected has been described in the present embodiment, threats can be detected by any other method. For example, the logical network configuration may be changed when a threat from any one of source node-b 302 and source node-d 304 is detected.

27. Operation of Network Protection Device

Details of the operation of network protection device 10 will now be described. FIG. 26 is a flowchart illustrating the operation of the network protection device according to the present embodiment.

The operation in FIG. 26 is the same as that in FIG. 14 in Embodiment 1. The same reference numerals will be given to the same processings as those in FIG. 14, and the description thereof will be omitted.

As illustrated in FIG. 26, network protection device 10 captures packet 1010 (step S001). Network analyzer 102 analyzes packet 1010 (step S002). Node data manager 104 calculates threat score 10427 (step S021). Network analyzer 102 determines whether a threat is detected or not (branch B003).

When a threat is detected (Y in branch B003), switch status getter 1032 gets the latest switch status 10320 from intelligent switch 20 (step S004). The processing then goes to branch B105.

When a threat is not detected (N in branch B003), node data manager 104 determines whether threat score 10427 is greater than 0 or not (branch B030). When threat score 10427 is 0 (N in branch B030), the processing returns to step S001. When threat score 10427 is greater than 0 (Y in branch B030), node data updater 1042 determines whether threat score 10427 is less than score Z to change the judgement of the threat level from gray to black (hereinafter, referred to as score Z) or not (branch B031).

When threat score 10427 is equal to or greater than score Z (N in branch B031), the processing returns to step S001. When threat score 10427 is less than score Z (Y in branch B031), node data updater 1042 determines whether time t0 has passed from the latest timestamp or not (branch B032).

When time t0 has not passed (N in branch B032), the processing returns to step S001. When time t0 has passed from the latest timestamp (Y in branch B032), node data updater 1042 subtracts 1 from threat score 10427 (step S033). From VLAN ID 10423 and VLAN ID table 10313, node data updater 1042 determines whether the VLAN network type is the normal network or not (branch B105).

When the VLAN network type is the quarantine network (N in branch B105), the processing goes to branch B006. When the VLAN network type is the normal network (Y in branch B105), the processing goes to branch B007.

Node data updater 1042 determines whether threat score 10427 is greater than threat score Y used when the quarantine network is switched to the normal network or not (branch B006).

When threat score 10427 is greater than threat score Y (Y in branch B006), the processing goes to step S008 without switching the VLAN to which switch port number 10422 belongs by VLAN ID setter 1033. When threat score 10427 is equal to or less than threat score Y (N in branch B006), the processing goes to step S161.

Node data updater 1042 determines whether threat score 10427 is less than threat score X used when the normal network is switched to the quarantine network or not (branch B007). When threat score 10427 is less than threat score X (Y in branch B007), the processing goes to step S008. When threat score 10427 is equal to or greater than threat score X (N in branch B007), the processing goes to step S171.

From VLAN ID 10423 of differential node data 10420, packet modificator 106 changes the VLAN ID of the VLAN, to which switch port number 10422 belongs, to the VLAN ID of the normal network, based on VLAN ID 10314 associated with VLAN group 10314*a* in VLAN ID table 10313 (step S161).

In step S161, sender nodes 302 and 304 to be quarantined are returned from the quarantine network to the normal network. In step S161, the VLAN ID is changed such that the VLAN to which the port of intelligent switch 20 connected to source node-b 302 in FIG. 25B belongs is changed from VLAN2*a* to VLAN1*a* in FIG. 25A. Alternatively, in step S161, VLAN ID is changed such that the VLAN to which the port of intelligent switch 20 connected to source node-d 304 in FIG. 25B is changed from VLAN2*b* to VLAN1*b* as in FIG. 25A.

From VLAN ID 10423 of differential node data 10420, packet modificator 106 changes the VLAN ID of the VLAN, to which switch port number 10422 belongs, to the VLAN ID of the quarantine network, based on VLAN ID 10314 associated with VLAN group 10314*a* in VLAN ID table 10313 (step S171).

In step S171, the node data is changed such that source node-d 304 belonging to the normal network belongs to the quarantine network, and the VLAN ID of the VLAN, to which the port of intelligent switch 20 connected to source node-b 302 in FIG. 25A belongs, is changed from VLAN1*a* to VLAN2*a* in FIG. 25B. Alternatively, in step S171, the VLAN ID is changed such that the VLAN, to which the port of the intelligent switch connected to source node-d 304 in FIG. 25B belongs, is changed from VLAN1*b* to VLAN2*b* as in FIG. 25B. Node data updater 1042 updates node data 10410 (step S008). Node data updater 1042 then returns the processing to step S001.

28. Operation of Threat Remover

Threat remover 105 is connected through the trunk line. Threat remover 105 has a function to remove packet 1010 serving as a threat from the communication performed between destination node-a 301 belonging to VLAN1*a* and source node-b 302 belonging to VLAN2*a* and between destination node-c 303 belonging to VLAN1*b* and source node-d 304 belonging to VLAN2*b*, and pass normal packet 1010.

In an embodiment, threat remover 105 may behave in a mode called a transparent mode where threat remover 105 behaves such that it is not present as a node on the communication network. In this case, the communication can be continued as it is even when the VLANs of source node-b 302 and source node-d 304 are switched.

Alternatively, threat remover 105 may behave as a router between the normal network and the quarantine network. In this case, threat remover 105 may behave as source node-b 302 when the communication is performed from destination node-a 301 to source node-b 302, threat remover 105 may behave as destination node-a 301 when the communication is performed from source node-b 302 to destination node-a 301, threat remover 105 may behave as source node-d 304 when the communication is performed from destination node-c 303 to source node-d 304, and threat remover 105 may behave as destination node-c 303 when the communication is performed from source node-d 304 to destination node-c 303. Specifically, ARP commands may be used.

29. Operation of Packet Modificator

Figure 27:
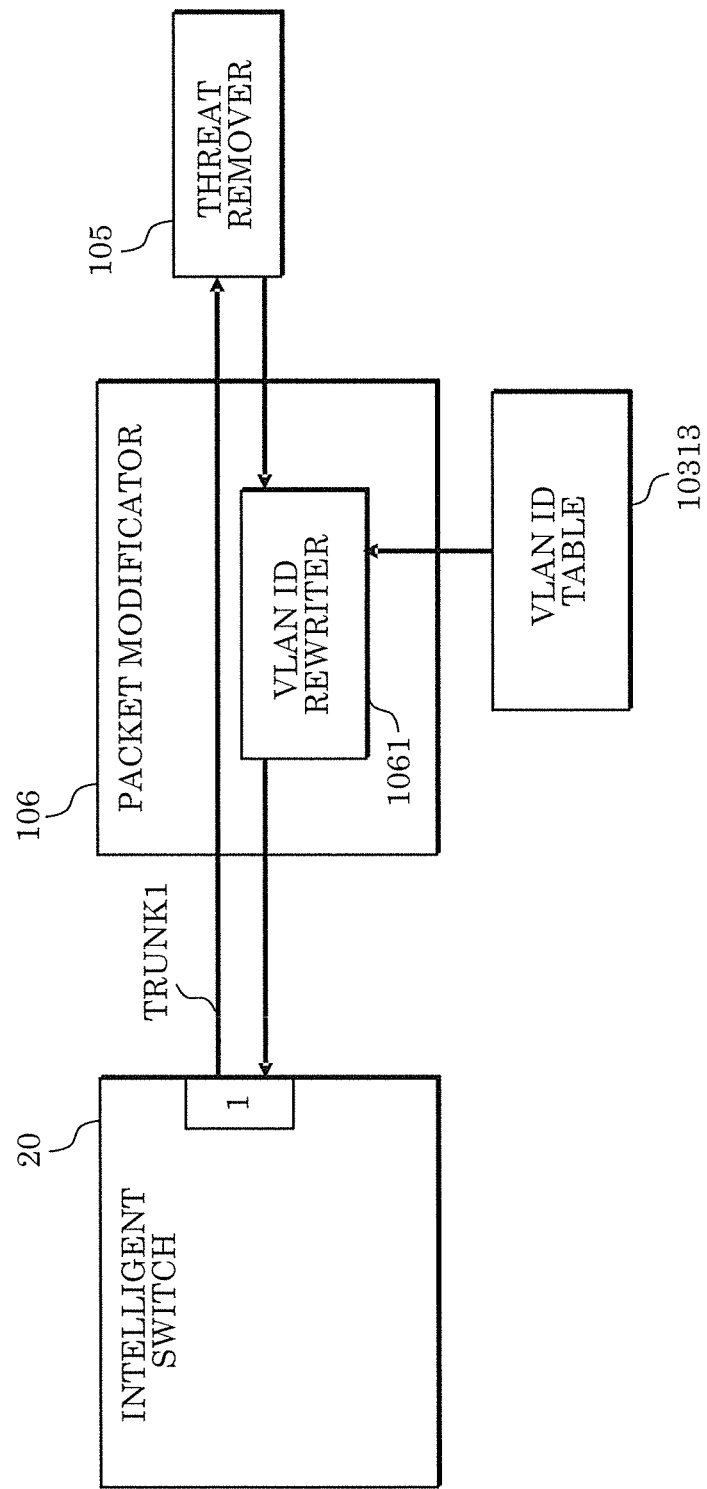
FIG. 27 is a diagram illustrating a configuration of a packet modificator according to Embodiment 2.

Details of the configuration of packet modificator 106 will now be described. FIG. 27 is a diagram illustrating a configuration of packet modificator 106 according to the present embodiment.

As illustrated in FIG. 27, packet modificator 106 is disposed between trunk line TRUNK1 connected to port 1 of intelligent switch 20 and threat remover 105, and has a function to rewrite the current VLAN ID of the packet after the threat is removed in threat remover 105.

Packet 1010 of the packet input to threat remover 105 contains different current VLAN ID between the normal network and the quarantine network. For this reason, receiver nodes 301 and 303 are not connected to the ports shown in the current VLAN ID only by transmitting the packet from threat remover 105 to intelligent switch 20 after the removal of the threat, and hence the communication between intelligent switch 20 and receiver nodes 301 and 303 is not established. To solve this problem, packet modificator 106 refers to VLAN ID table 10313 about the packet input to threat remover 105, and mutually converts the VLAN IDs contained in the same VLAN group.

Thereby, when the communication is performed from source node-b 302 to destination node-a 301, packet modificator 106 changes the current VLAN ID from VLAN2*a* to VLAN1*a* in the packet from which the threat is removed and which passes through threat remover 105. The destination of the changed packet received by port 1 of intelligent switch 20 is then changed to port 4 of VLAN1*a* to which destination node-a 301 is connected.

When the communication is performed from destination node-a 301 to source node-b 302, packet modificator 106 changes the current VLAN ID from VLAN1*a* to VLAN2*a* in the packet from which the threat is removed and which passes through threat remover 105. The destination of the changed packet received by port 1 of intelligent switch 20 is then changed to port 7 of VLAN2*a* to which source node-b 302 is connected.

Thus, the communication is maintained between source node-b 302 and destination node-a 301.

When the communication is performed from source node-d 304 to destination node-c 303, packet modificator 106 changes the current VLAN ID from VLAN2*b* to VLAN1*b* in the packet from which the threat is removed and which passes through threat remover 105. The destination of the changed packet received by port 1 of intelligent switch 20 is then changed to port 5 of VLAN1*a* to which destination node-c 303 is connected.

When the communication is performed from destination node-c 303 to source node-d 304, packet modificator 106 changes the current VLAN ID from VLAN1*b* to VLAN2*b* in the packet from which the threat is removed and which passes through threat remover 105. The destination of the changed packet received by port 1 of intelligent switch 20 is then changed to port 6 of VLAN2*b* to which source node-d 304 is connected.

Thus, the communication is maintained between source node-d 304 and destination node-c 303.

30. Other Modifications of Embodiment 2

Although the present disclosure has been described based on the embodiment above, the embodiment will not be limitative to the present disclosure and Modification 1 of Embodiment 2 and Modification 2 of Embodiment 2 as follows are also included in the present disclosure.

Figure 28:
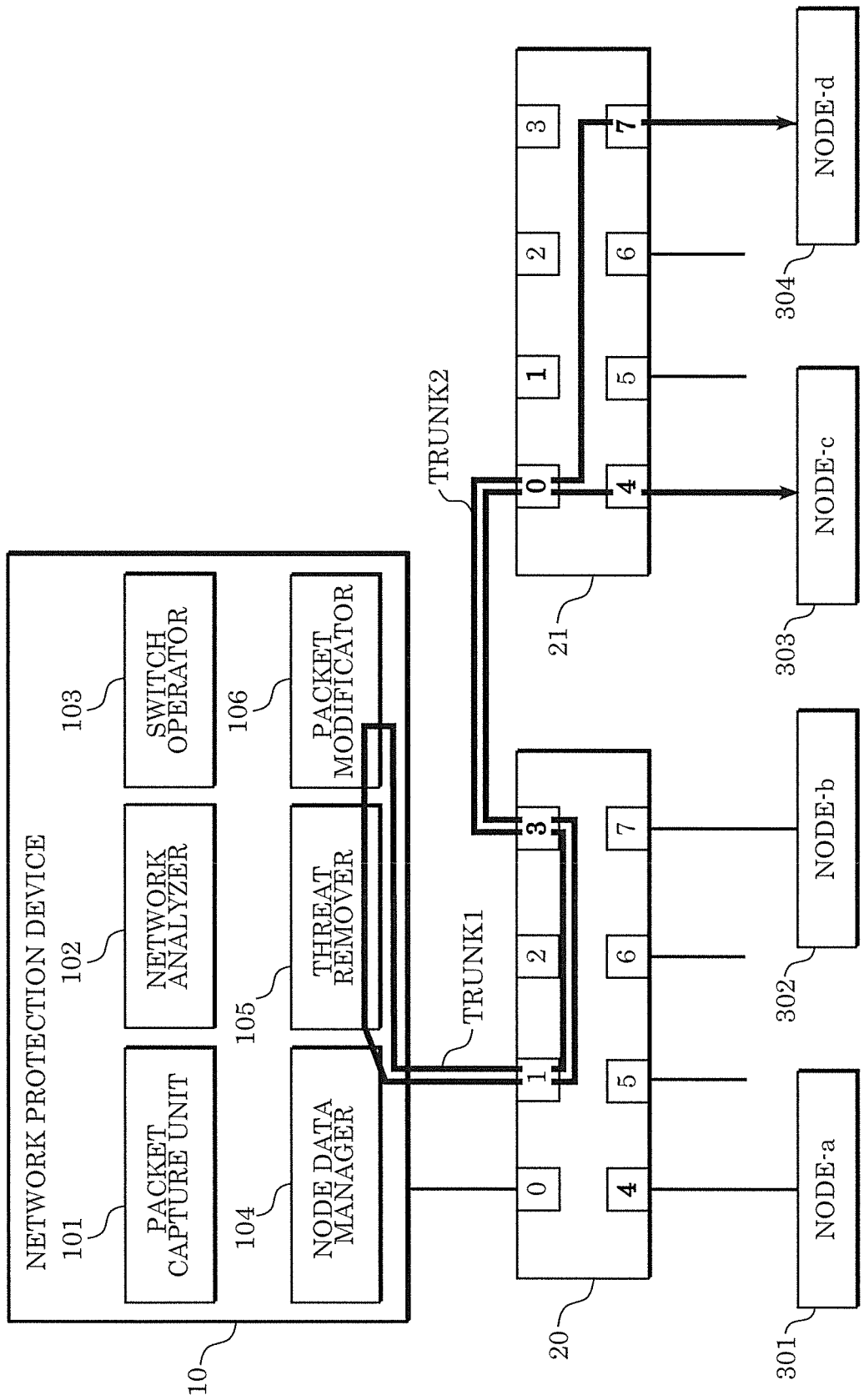
FIG. 28 is a diagram illustrating an entire configuration of another communication network, to which a network protection device according to Modification 1 of Embodiment 2 belongs.

Modification 1 of Embodiment 2 (hereinafter, referred to as the present modification) will be described. As illustrated in FIG. 28, port 3 of intelligent switch 20 is connected to port 0 of intelligent switch 21 through trunk line TRUNK2. Network protection device 10 is connected to port 1 of intelligent switch 20 through trunk line TRUNK1.

Intelligent switch 21 sets port 4 and port 7 of intelligent switch 21 in VLAN1a at the start of communication operation between source node-d 304 and destination node-c 303. Alternatively, a mirror function may be set where network protection device 10 is connected to any port of intelligent switch 21 through LAN cable. At this time, packet capture unit 101 also captures packet 1010 from any port of intelligent switch 21.

The operation is as described in FIG. 13A above in the case where source node-d 304 communicates with destination node-c 303 in the normal network. The operation is as described in FIG. 17B above in the case where source node-d 304 communicates with destination node-c 303 in the quarantine network. The path represented by the bold solid line in FIG. 28 is one example of the second communication path.

Network protection device 10 according to the present modification having such a configuration can protect the network connected to intelligent switch 20 and intelligent switch 21.

Figure 29:
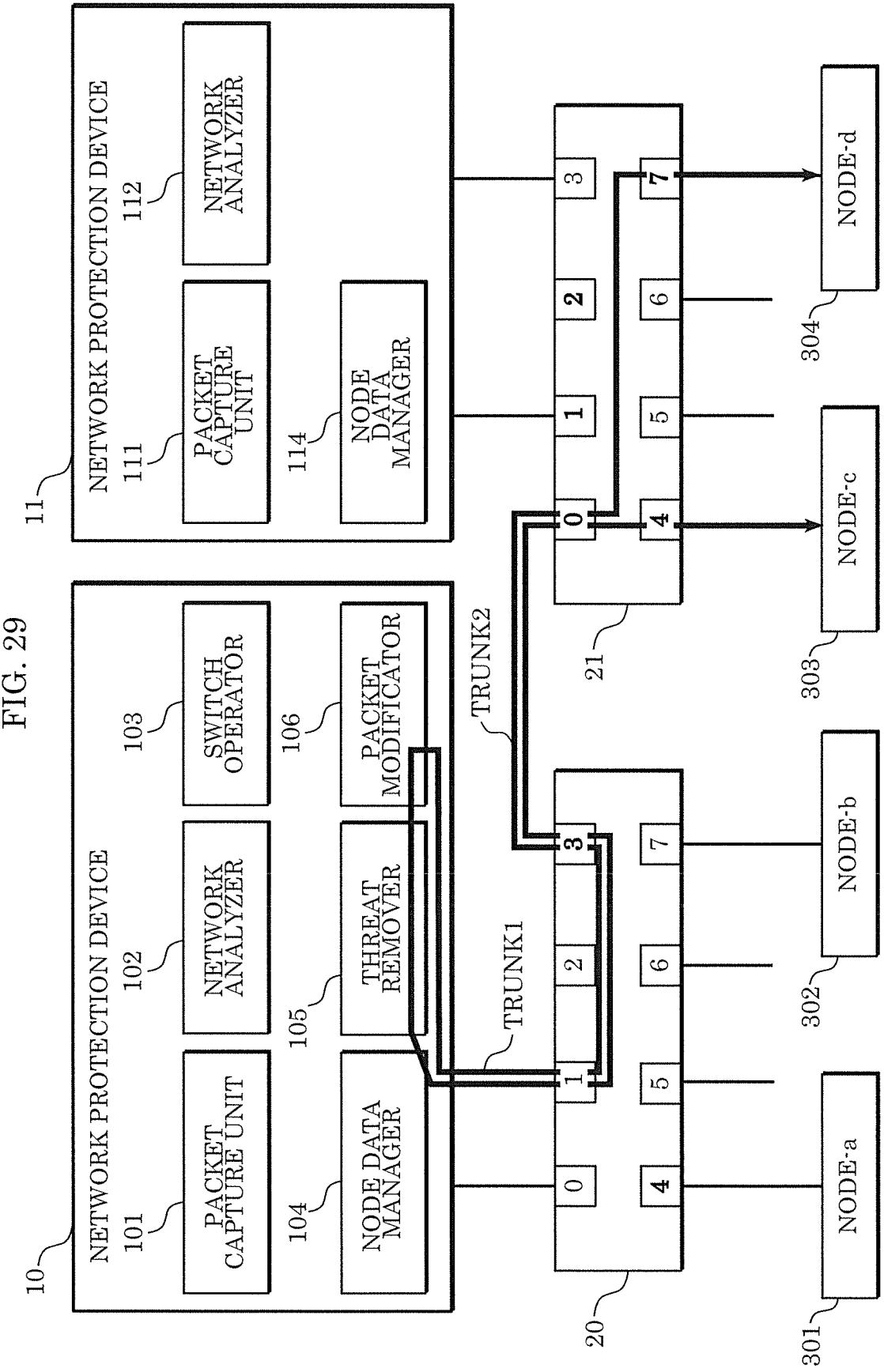
FIG. 29 is a diagram illustrating an entire configuration of another communication network, to which a network protection device according to Modification 2 of Embodiment 2 belongs.

Modification 2 of Embodiment 2 (hereinafter, referred to as the present modification) will be described. Although the entire configuration of the network in FIG. 28 includes a single network protection device 10 connected to a single intelligent switch 20, the network may have another configuration including multiple network protection devices to which the functions of network protection device 10 are distributed, or may have a configuration illustrated in FIG. 29 where multiple intelligent switches 20 are further connected to multiple network protection devices. FIG. 29 is a diagram illustrating an entire configuration of the communication network to which network protection devices 10 and 11 according to the present modification belong.

As illustrated in FIG. 29, the communication network includes network protection devices 10 and 11, intelligent switch 20, destination node-a 301, and source node-b 302, and further includes intelligent switch 21, destination node-c 303, and source node-d 304 connected through LAN cables. Intelligent switch 21 has a mirror function enabling output of a copy of packet 1010 passing through intelligent switch 21. In intelligent switch 21, port 1 is connected to network protection device 11 with an LAN cable. For example, commands for controlling intelligent switch 21 are communicated between network protection device 10 and port 1 of intelligent switch 21.

In this communication network, network protection device 11 connected to intelligent switch 21 includes packet capture unit 111, network analyzer 112, and node data manager 114.

The operation is as described in FIG. 13A above in the case where source node-d 304 communicates with destination node-c 303 in the normal network. In the case where the communication is performed in the quarantine network, switch operator 103 performs switching such that source node-d 304 belongs to VLAN2b where source node-d 304 is connected to threat remover 105 in network protection device 10 through ports 7 and 0 of intelligent switch 21 and ports 3 and 1 of intelligent switch 20, and destination node-c 303 belongs to VLAN1b where threat remover 105 in network protection device 10 is connected to destination node-c 303 through port 1 and port 3 of intelligent switch 20 and port 0 and port 4 of intelligent switch 21. At this time, packet modificator 106 changes the current VLAN ID in packet 1010, which passes through threat remover 105, from VLAN1b to VLAN2b. Port 1 of intelligent switch 21 is set as a mirror function. The path represented by the bold solid line in FIG. 29 is one example of the second communication path.

Such a configuration enables the detection of threats in a distributed manner in the network including multiple intelligent switches 20 and 21, avoiding the concentration of packet 1010 passing through each of intelligent switches 20 and 21 to a single network protection device during the detection of threats. For this reason, the load on the network can be reduced.

31. Other Modifications (1) Although not illustrated, network protection device 10 may acquire and appropriately display any information such as node data 10410 from all the pieces of information managed by node data manager 104 in Embodiments 1 and 2 and Modifications 1 and 2 of Embodiments 1 and 2 described above. Network protection device 10 may also include an input with which a user updates and sets the information as necessary.

For example, initial setting of switch 1031 and node data manager setting 1043 should be set once before the operation of communication. At this time, the setting of the information may be performed using a display and an input, and may be updated by network protection device 10 during the operation of communication.

Alternatively, network protection device 10 may include a display and an input so as to perform a setting to switch the VLAN of the port connected to a specific node in response to a user's input to increase the threat score of the node.

At this time, as a reference for updating the setting, network protection device 10 may use the threat of a node visualized by displaying threat score 10418 of node data 10410 in the form of a graph plotted chronologically.

(2) Although network protection device 10 in FIG. 1 is illustrated as a single device in Embodiments 1 and 2 and Modifications 1 and 2 of Embodiments 1 and 2 described above, network protection device 10 may be a device integrated with intelligent switch 20. All the functions of network protection device 10 do not have to be implemented only with a single device. Network protection device 10 may include multiple devices. Alternatively, intelligent switch 20 may use an SDN switch, for example, and may use a communication protocol for control, such as OpenFlow.

(3) The functions of Embodiments 1 and 2 and Modifications 1 and 2 of Embodiments 1 and 2 described above may be configured as computer programs, may be configured as a dedicated large scale integrated circuit (LSI) called an application specific integrated circuit (ASIC), may be configured using a function-reconfigurable LSI, such as a programmable logic device (PLD) and a field programmable gate array (FPGA), or may be configured as a combination of several methods including those described above. Alternatively, several functions or all the functions included in network protection device 10 may be configured as a single integrated circuit called System-on-a-Chip (SoC) LSI. Alternatively, these functions may be configured using any other techniques which provide the functions equivalent to those of computer programs, LSIs, FPGAs, and SoCs.

(4) In Embodiments 1 and 2 and Modifications 1 and 2 of Embodiments 1 and 2 described above, a commercially available IDS may be used as part or all of the detectors in flow analyzer 1021 or part or all of the detectors in payload analyzer 1022 in FIG. 3.

(5) Embodiments 1 and 2 and Modifications 1 and 2 of Embodiments 1 and 2 described above may use only part of detectors 10211 to 10214 included in flow analyzer 1021 and detectors 10221 to 10223 included in payload analyzer 1022 in network analyzer 102 in FIG. 3, or may use detectors other than these detectors.

For example, Embodiments 1 and 2 and Modifications 1 and 2 of Embodiments 1 and 2 can use a method of determining the result of pattern analysis by numerical ranking thereof using machine learning, a method of selecting any method from all the methods included in network analyzer 102 and determining the correlation, a method of determining the correlation with the result of analysis of the communication performed in the past, or a method of determining the result of analysis by extracting the pattern of the communications performed in the past and numerically ranking the degree of deviation from the pattern.

(6) Threat remover 105 may use usually commercially available IPSs, FWs, or UTM devices in Embodiments 1 and 2 and Modifications 1 and 2 of Embodiments 1 and 2 described above.

(7) In Embodiments 1 and 2 and Modifications 1 and 2 of Embodiments 1 and 2 described above, threat remover 105 may remove only packet 1010 serving as a threat by a method called signature method as in IPS, or may prepare a whitelist of a minimum body of communication information which should be passed, and remove all the network packets which do not match with those in the whitelist.

(8) Although the IP addresses are fixed in the illustrations in Embodiments 1 and 2 and Modifications 1 and 2 of Embodiments 1 and 2 described above, a dynamic host configuration protocol (DHCP) may be used, for example.

(9) Although threat remover 105 removes the threat included in packet 1010 in Embodiments 1 and 2 and Modifications 1 and 2 of Embodiments 1 and 2 described above, threat remover 105 may remove the packet itself. In this case, the packet does not have to be transmitted to the receiver node.

Although the network protection devices and network protection systems according to one or more aspects have been described above based on Embodiments 1 and 2 and Modifications 1 and 2 of Embodiments 1 and 2, Embodiments 1 and 2 and Modifications 1 and 2 of Embodiments 1 and 2 should not be construed as limitations to the present disclosure. A variety of modifications of the present Embodiments 1 and 2 and Modifications 1 and 2 of Embodiments 1 and 2 conceived and made by persons skilled in the art without departing from the gist of the present disclosure, and embodiments including combinations of components in different embodiments may also be included in the scope of the one or more aspects.

Although the present disclosure has been described and illustrated in detail, it is clearly understood that the same is by way of example only and is not to be taken by way of limitation, the scope of the present disclosure being limited only by the terms of the appended claims.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can detect a threat or a suspicion of a threat from the communication between nodes in a subnetwork and remove the network packet including the threat, and can achieve the detection of the threat at earlier stages and the ensured separation of the nodes by performing processing where the detection of the threat is separated from the removal of the threat. Moreover, the present disclosure can minimize the delay of communication and control and the risks of malfunctions of the control systems in facilities and factories, and at the same time can enhance the security level in the subnetwork.

What is claimed is:

1. A network protection device, comprising:

a processor; and a non-transitory computer-readable medium having instructions stored thereon that, when executed by the processor, cause the network protection device to function as:

a packet capture unit which includes multiple local area network (LAN) ports, and captures a network packet in a promiscuous mode through a switch which performs connection in a communication network or across communication networks, the network packet flowing through the switch and containing at least information of a sender node and information of a receiver node;

a threat detector which detects a threat in the network packet;

a threat remover; and a virtual local area network identification (VLAN ID) setter which operates the switch to change a communication path, when a threat is detected in the threat detector, such that a first communication path which connects the sender node to the receiver node without the threat remover is changed to a second communication path which is different from the first communication path and connects the sender node to the receiver node through the threat remover, wherein after the VLAN ID setter changes the communication path, the threat remover removes the threat in the network packet, the switch includes a first LAN port connected to the sender node, a second LAN port and a third LAN port connected to the threat detector, and a fourth LAN port connected to the receiver node, when a threat is not detected in the threat detector, the VLAN ID setter sets the first communication path from the sender node connected to the first LAN port to the receiver node connected to the fourth LAN port to a first virtual local area network (VLAN), and when a threat is detected in the threat detector, the VLAN ID setter sets part of the second communication path from the sender node connected to the first LAN port to the threat remover connected to the second LAN port, which is contained in the second communication path, to a second VLAN different from the first VLAN, and sets part of the second communication path from the threat remover connected to the third LAN port to the receiver node connected to the fourth LAN port, which is contained in the second communication path, to the first VLAN.

2. A network protection device, comprising:
a processor; and
a non-transitory computer-readable medium having instructions stored thereon that, when executed by the processor, cause the network protection device to function as:
a packet capture unit which includes multiple local area network (LAN) ports, and captures a network packet in a promiscuous mode through a switch which performs connection in a communication network or across communication networks, the network packet flowing through the switch and containing at least information of a sender node and information of a receiver node;
a threat detector which detects a threat in the network packet;
a threat remover;
a virtual local area network identification (VLAN ID) setter which operates the switch to change a communication path, when a threat is detected in the threat detector, such that a first communication path which connects the sender node to the receiver node without the threat remover is changed to a second communication path which is different from the first communication path and connects the sender node to the receiver node through the threat remover; and
a rewriter which changes VLAN ID of a communication network included in the network packet which passes through the threat remover,
wherein after the VLAN ID setter changes the communication path, the threat remover removes the threat in the network packet,
the switch includes a fifth LAN port connected to the sender node, a sixth LAN port connected to the threat remover, and a seventh LAN port connected to the receiver node,
when a threat is not detected in the threat detector, the VLAN ID setter sets the sender node connected to the fifth LAN port and the receiver node connected to the seventh LAN port to the first VLAN,
when a threat is detected in the threat detector, the VLAN ID setter sets the sender node connected to the fifth LAN port to the second VLAN and sets the receiver node connected to the seventh LAN port to the first VLAN, the sender node and the receiver node being included in the second communication path, and
the rewriter changes VLAN ID indicating the second VLAN, to which the sender node belongs, to VLAN ID indicating the first VLAN to which the receiver node belongs, through the sixth LAN port, and outputs the network packet containing the VLAN ID, which is changed, to the switch.

3. The network protection device according to claim 1, wherein the first VLAN is a normal network without the threat remover,
the second VLAN is a quarantine network where the threat remover removes a threat in the network packet, and
when the threat is detected in the threat detector, the VLAN ID setter changes part of the first VLAN from the normal network to the quarantine network.

4. The network protection device according to claim 3, wherein after the threat in the network packet is removed in the threat remover, the VLAN ID setter reverts the quarantine network, which has been changed from the normal network, to the normal network.

5. The network protection device according to claim 1, wherein the packet capture unit captures a copy of the network packet, and
the threat detector monitors the copy of the network packet in the promiscuous mode.

6. The network protection device according to claim 1, wherein the threat remover removes unnecessary data including the threat from the network packet where the threat is detected.

7. The network protection device according to claim 1, wherein the threat detector gives a score to the sender node from which the threat is detected, according to a content of the threat which is detected, and
when the score given in the threat detector exceeds a first value, the VLAN ID setter causes the switch to change the communication path such that network packet concerning the sender node to which the score is given passes via the threat remover.

8. A network protection device, comprising:
a processor; and
a non-transitory computer-readable medium having instructions stored thereon that, when executed by the processor, cause the network protection device to function as:
a packet capture unit which includes multiple local area network (LAN) ports, and captures a network packet in a promiscuous mode through a switch which performs connection in a communication network or across communication networks, the network packet flowing through the switch and containing at least information of a sender node and information of a receiver node;
a threat detector which detects a threat in the network packet;
a threat remover; and
a virtual local area network identification (VLAN ID) setter which operates the switch to change a communication path, when a threat is detected in the threat detector, such that a first communication path which connects the sender node to the receiver node without the threat remover is changed to a second communication path which is different from the first communication path and connects the sender node to the receiver node through the threat remover,
wherein after the VLAN ID setter changes the communication path, the threat remover removes the threat in the network packet,
the threat detector gives a score to the sender node from which the threat is detected, according to a content of the threat which is detected,
when the score given in the threat detector exceeds a first value, the VLAN ID setter causes the switch to change the communication path such that network packet concerning the sender node to which the score is given passes via the threat remover,
the threat detector subtracts a predetermined value from the score after a predetermined time has passed since the score was given, and
when the score of the threat which is detected is less than a second value, the VLAN ID setter causes the switch to change the communication path such that the sender node is connected to the receiver node without the threat remover.

9. The network protection device according to claim 8, wherein when the score of the threat which is detected exceeds a third value greater than the first value, the threat detector does not subtract the predetermined value from the score even after a predetermined time has passed since the score was given.

10. The network protection device according to claim 2, wherein the packet capture unit captures a copy of the network packet, and
the threat detector monitors the copy of the network packet in the promiscuous mode.

11. The network protection device according to claim 2, wherein the threat remover removes unnecessary data including the threat from the network packet where the threat is detected.

12. The network protection device according to claim 2, wherein the threat detector gives a score to the sender node from which the threat is detected, according to a content of the threat which is detected, and
when the score given in the threat detector exceeds a first value, the VLAN ID setter causes the switch to change the communication path such that network packet concerning the sender node to which the score is given passes via the threat remover.

13. The network protection device according to claim 12, wherein the threat detector subtracts a predetermined value from the score after a predetermined time has passed since the score was given, and
when the score of the threat which is detected is less than a second value, the VLAN ID setter causes the switch to change the communication path such that the sender node is connected to the receiver node without the threat remover.

14. The network protection device according to claim 13, wherein when the score of the threat which is detected exceeds a third value greater than the first value, the threat detector does not subtract the predetermined value from the score even after a predetermined time has passed since the score was given.

15. The network protection device according to claim 8, wherein the switch includes a first LAN port connected to the sender node, a second LAN port and a third LAN port connected to the threat detector, and a fourth LAN port connected to the receiver node,
when a threat is not detected in the threat detector, the VLAN ID setter sets the first communication path from the sender node connected to the first LAN port to the receiver node connected to the fourth LAN port to a first virtual local area network (VLAN), and
when a threat is detected in the threat detector, the VLAN ID setter sets part of the second communication path from the sender node connected to the first LAN port to the threat remover connected to the second LAN port, which is contained in the second communication path, to a second VLAN different from the first VLAN, and sets part of the second communication path from the threat remover connected to the third LAN port to the receiver node connected to the fourth LAN port, which is contained in the second communication path, to the first VLAN.

16. The network protection device according to claim 15, wherein the first VLAN is a normal network without the threat remover,
the second VLAN is a quarantine network where the threat remover removes a threat in the network packet, and
when the threat is detected in the threat detector, the VLAN ID setter changes part of the first VLAN from the normal network to the quarantine network.

17. The network protection device according to claim 8, wherein the packet capture unit captures a copy of the network packet, and
the threat detector monitors the copy of the network packet in the promiscuous mode.

18. The network protection device according to claim 8, wherein the threat remover removes unnecessary data including the threat from the network packet where the threat is detected.

19. The network protection device according to claim 7, wherein the threat detector subtracts a predetermined value from the score after a predetermined time has passed since the score was given, and
when the score of the threat which is detected is less than a second value, the VLAN ID setter causes the switch to change the communication path such that the sender node is connected to the receiver node without the threat remover.

20. The network protection device according to claim 19, wherein when the score of the threat which is detected exceeds a third value greater than the first value, the threat detector does not subtract the predetermined value from the score even after a predetermined time has passed since the score was given.

* * * * *